US010332007B2

(12) United States Patent
Knight et al.

(10) Patent No.: US 10,332,007 B2
(45) Date of Patent: Jun. 25, 2019

(54) COMPUTER-IMPLEMENTED SYSTEM AND METHOD FOR GENERATING DOCUMENT TRAINING SETS

(71) Applicant: Nuix North America Inc., Herndon, VA (US)

(72) Inventors: William C. Knight, Bainbridge Island, WA (US); Sean M. McNee, Seattle, WA (US)

(73) Assignee: Nuix North America Inc., Herndon, VA (US)

( * ) Notice: Subject to any disclaimer, the term of this patent is extended or adjusted under 35 U.S.C. 154(b) by 0 days.

(21) Appl. No.: 15/345,471

(22) Filed: Nov. 7, 2016

(65) Prior Publication Data

US 2017/0076203 A1    Mar. 16, 2017

Related U.S. Application Data

(60) Continuation of application No. 14/108,257, filed on Dec. 16, 2013, now Pat. No. 9,489,446, which is a
(Continued)

(51) Int. Cl.
*G06N 5/02* (2006.01)
*G06F 16/28* (2019.01)
(Continued)

(52) U.S. Cl.
CPC ............ *G06N 5/02* (2013.01); *G06F 16/285* (2019.01); *G06F 16/35* (2019.01); *G06F 16/40* (2019.01); *G06F 16/93* (2019.01)

(58) Field of Classification Search
CPC ......... G06F 17/30011; G06F 17/30017; G06F 17/30598
(Continued)

(56) References Cited

U.S. PATENT DOCUMENTS 3,416,150 A   12/1968   Lindberg
3,426,210 A   2/1969    Agin
(Continued)

FOREIGN PATENT DOCUMENTS

EP   0886227    12/1998
EP   1024437    8/2000
(Continued)

OTHER PUBLICATIONS

O'Neill et al., "DISCO: Intelligent Help for Document Review," 12th International Conference on Artificial Intelligence and Law, Barcelona, Spain, Jun. 8, 2009, pp. 1-10, ICAIL 2009, Association for Computing Machinery, Red Hook, New York (Online); XP 002607216.
(Continued)

*Primary Examiner* — Jean B Fleurantin
(74) *Attorney, Agent, or Firm* — Brown Rudnick LLP; Mark S. Leonardo

(57) ABSTRACT

A computer-implemented system and method for generating document training sets is provided. Unclassified documents are provided to two or more classifiers. A classification code assigned to each unclassified document is received. A determination is made as to whether a disagreement exists between classification codes assigned to a common unclassified document via different classifiers. The common unclassified document with a disagreement in classification codes are provided for further review. Results of the further review include one of a new classification code and confirmation of one of the assigned classification codes. The unclassified documents for which a disagreement exists are grouped as a training set.

16 Claims, 10 Drawing Sheets

Related U.S. Application Data division of application No. 12/862,682, filed on Aug. 24, 2010, now Pat. No. 8,612,446.

(60) Provisional application No. 61/236,490, filed on Aug. 24, 2009.

(51) Int. Cl.
*G06F 16/35* (2019.01)
*G06F 16/40* (2019.01)
*G06F 16/93* (2019.01)
*G06F 17/30* (2006.01)

(58) Field of Classification Search
USPC .................................................. 707/708, 737
See application file for complete search history.

(56) References Cited

U.S. PATENT DOCUMENTS

| | | | |
|---|---|---|---|
| 3,668,658 A | 6/1972 | Flores et al. |
| 4,893,253 A | 1/1990 | Lodder |
| 4,991,087 A | 2/1991 | Burkowski et al. |
| 5,056,021 A | 10/1991 | Ausborn |
| 5,121,338 A | 6/1992 | Lodder |
| 5,133,067 A | 7/1992 | Hara et al. |
| 5,182,773 A | 1/1993 | Bahl et al. |
| 5,278,980 A | 1/1994 | Pedersen et al. |
| 5,359,724 A | 10/1994 | Earle |
| 5,371,673 A | 12/1994 | Fan |
| 5,371,807 A | 12/1994 | Register et al. |
| 5,442,778 A | 8/1995 | Pedersen et al. |
| 5,450,535 A | 9/1995 | North |
| 5,477,451 A | 12/1995 | Brown et al. |
| 5,488,725 A | 1/1996 | Turtle et al. |
| 5,524,177 A | 6/1996 | Suzuoka |
| 5,528,735 A | 6/1996 | Strasnick et al. |
| 5,619,632 A | 4/1997 | Lamping et al. |
| 5,619,709 A | 4/1997 | Caid et al. |
| 5,635,929 A | 6/1997 | Rabowsky et al. |
| 5,649,193 A | 7/1997 | Sumita et al. |
| 5,675,819 A | 10/1997 | Schuetze |
| 5,696,962 A | 12/1997 | Kupiec |
| 5,706,497 A | 1/1998 | Takahashi et al. |
| 5,737,734 A | 4/1998 | Schultz |
| 5,754,938 A | 5/1998 | Herz et al. |
| 5,754,939 A | 5/1998 | Herz et al. |
| 5,787,422 A | 7/1998 | Tukey et al. |
| 5,794,178 A | 8/1998 | Caid et al. |
| 5,794,236 A | 8/1998 | Mehrle |
| 5,799,276 A | 8/1998 | Komissarchik et al. |
| 5,819,258 A | 10/1998 | Vaithyanathan et al. |
| 5,819,260 A | 10/1998 | Lu et al. |
| 5,835,905 A | 11/1998 | Pirolli et al. |
| 5,842,203 A | 11/1998 | D'Elena et al. |
| 5,844,991 A | 12/1998 | Hochberg et al. |
| 5,857,179 A | 1/1999 | Vaithyanathan et al. |
| 5,860,136 A | 1/1999 | Fenner |
| 5,862,325 A | 1/1999 | Reed et al. |
| 5,864,846 A | 1/1999 | Voorhees et al. |
| 5,864,871 A | 1/1999 | Kitain et al. |
| 5,867,799 A | 2/1999 | Lang et al. |
| 5,870,740 A | 2/1999 | Rose et al. |
| 5,895,470 A | 4/1999 | Pirolli et al. |
| 5,909,677 A | 6/1999 | Broder et al. |
| 5,915,024 A | 6/1999 | Kitaori et al. |
| 5,915,249 A | 6/1999 | Spencer |
| 5,920,854 A | 7/1999 | Kirsch et al. |
| 5,924,105 A | 7/1999 | Punch et al. |
| 5,940,821 A | 8/1999 | Wical |
| 5,943,669 A | 8/1999 | Numata |
| 5,950,146 A | 9/1999 | Vapnik |
| 5,950,189 A | 9/1999 | Cohen et al. |
| 5,966,126 A | 10/1999 | Szabo |
| 5,974,412 A | 10/1999 | Hazlehurst et al. |
| 5,987,446 A | 11/1999 | Corey et al. |
| 5,987,457 A | 11/1999 | Ballard |
| 6,006,221 A | 12/1999 | Liddy et al. |
| 6,012,053 A | 1/2000 | Pant et al. |
| 6,026,397 A | 2/2000 | Sheppard |
| 6,038,574 A | 3/2000 | Pitkow et al. |
| 6,070,133 A | 5/2000 | Brewster et al. |
| 6,089,742 A | 7/2000 | Warmerdam et al. |
| 6,091,424 A | 7/2000 | Madden |
| 6,092,059 A | 7/2000 | Straforini et al. |
| 6,092,091 A | 7/2000 | Sumita et al. |
| 6,094,649 A | 7/2000 | Bowen et al. |
| 6,100,901 A | 8/2000 | Mohda et al. |
| 6,108,446 A | 8/2000 | Hoshen |
| 6,119,124 A | 9/2000 | Broder et al. |
| 6,122,628 A | 9/2000 | Castelli et al. |
| 6,134,541 A | 10/2000 | Castelli et al. |
| 6,137,499 A | 10/2000 | Tesler |
| 6,137,545 A | 10/2000 | Patel et al. |
| 6,137,911 A * | 10/2000 | Zhilyaev ..................... 382/225 |
| 6,144,962 A | 11/2000 | Weinberg |
| 6,148,102 A | 11/2000 | Stolin |
| 6,154,213 A | 11/2000 | Rennison et al. |
| 6,154,219 A | 11/2000 | Wiley et al. |
| 6,167,368 A | 12/2000 | Wacholder |
| 6,173,275 B1 | 1/2001 | Caid et al. |
| 6,202,064 B1 | 3/2001 | Julliard |
| 6,216,123 B1 | 4/2001 | Robertson et al. |
| 6,243,713 B1 | 6/2001 | Nelson et al. |
| 6,243,724 B1 | 6/2001 | Mander et al. |
| 6,253,218 B1 | 6/2001 | Aoki et al. |
| 6,260,038 B1 | 7/2001 | Martin et al. |
| 6,300,947 B1 | 10/2001 | Kanebsky |
| 6,326,962 B1 | 12/2001 | Szabo |
| 6,338,062 B1 | 1/2002 | Liu |
| 6,345,243 B1 | 2/2002 | Clark |
| 6,349,296 B1 | 2/2002 | Broder et al. |
| 6,349,307 B1 | 2/2002 | Chen |
| 6,360,227 B1 | 3/2002 | Aggarwal et al. |
| 6,363,374 B1 | 3/2002 | Corston-Oliver et al. |
| 6,377,287 B1 | 4/2002 | Hao et al. |
| 6,381,601 B1 | 4/2002 | Fujiwara et al. |
| 6,389,433 B1 | 5/2002 | Bolonsky et al. |
| 6,389,436 B1 | 5/2002 | Chakrabarti et al. |
| 6,408,294 B1 | 6/2002 | Getchius et al. |
| 6,414,677 B1 | 7/2002 | Robertson et al. |
| 6,415,283 B1 | 7/2002 | Conklin |
| 6,418,431 B1 | 7/2002 | Mahajan et al. |
| 6,421,709 B1 | 7/2002 | McCormick et al. |
| 6,438,537 B1 | 8/2002 | Netz et al. |
| 6,438,564 B1 | 8/2002 | Morton et al. |
| 6,442,592 B1 | 8/2002 | Alumbaugh et al. |
| 6,446,061 B1 | 9/2002 | Doerre et al. |
| 6,449,612 B1 | 9/2002 | Bradley et al. |
| 6,453,327 B1 | 9/2002 | Nielsen |
| 6,460,034 B1 | 10/2002 | Wical |
| 6,470,307 B1 | 10/2002 | Turney |
| 6,480,843 B2 | 11/2002 | Li |
| 6,480,885 B1 | 11/2002 | Olivier |
| 6,484,168 B1 | 11/2002 | Pennock et al. |
| 6,484,196 B1 | 11/2002 | Maurille |
| 6,493,703 B1 | 12/2002 | Knight et al. |
| 6,496,822 B2 | 12/2002 | Rosenfelt et al. |
| 6,502,081 B1 | 12/2002 | Wiltshire, Jr. et al. |
| 6,507,847 B1 | 1/2003 | Fleischman |
| 6,510,406 B1 | 1/2003 | Marchisio |
| 6,519,580 B1 | 2/2003 | Johnson et al. |
| 6,523,026 B1 | 2/2003 | Gillis |
| 6,523,063 B1 | 2/2003 | Miller et al. |
| 6,542,635 B1 | 4/2003 | Hu et al. |
| 6,542,889 B1 | 4/2003 | Aggarwal et al. |
| 6,544,123 B1 | 4/2003 | Hiromichi et al. |
| 6,549,957 B1 | 4/2003 | Hanson et al. |
| 6,560,597 B1 | 5/2003 | Dhillon et al. |
| 6,571,225 B1 | 5/2003 | Oles et al. |
| 6,564,202 B1 | 6/2003 | Schuetze et al. |
| 6,584,564 B2 | 6/2003 | Olkin et al. |
| 6,594,658 B2 | 7/2003 | Woods |
| 6,598,054 B2 | 7/2003 | Schuetze et al. |
| 6,606,625 B1 | 8/2003 | Muslea et al. |

(56) References Cited

U.S. PATENT DOCUMENTS

| | | |
|---|---|---|
| 6,611,825 B1 | 8/2003 | Billheimer et al. |
| 6,628,304 B2 | 9/2003 | Mitchell et al. |
| 6,629,097 B1 | 9/2003 | Keith |
| 6,640,009 B2 | 10/2003 | Zlotnick |
| 6,651,057 B1 | 11/2003 | Jin et al. |
| 6,654,739 B1 | 11/2003 | Apte et al. |
| 6,658,423 B1 | 12/2003 | Pugh et al. |
| 6,675,159 B1 | 1/2004 | Lin et al. |
| 6,675,164 B2 | 1/2004 | Kamath et al. |
| 6,678,705 B1 | 1/2004 | Berchtold et al. |
| 6,684,205 B1 | 1/2004 | Modha et al. |
| 6,697,998 B1 | 2/2004 | Damerau et al. |
| 6,701,305 B1 | 3/2004 | Holt et al. |
| 6,711,585 B1 | 3/2004 | Copperman et al. |
| 6,714,929 B1 | 3/2004 | Micaelian et al. |
| 6,714,936 B1 | 3/2004 | Nevin |
| 6,728,752 B1 | 4/2004 | Chen |
| 6,735,578 B2 | 5/2004 | Shetty et al. |
| 6,738,759 B1 | 5/2004 | Wheeler et al. |
| 6,747,646 B2 | 6/2004 | Gueziec et al. |
| 6,751,628 B2 | 6/2004 | Coady |
| 6,757,646 B2 | 6/2004 | Marchisio |
| 6,785,679 B1 | 8/2004 | Dane et al. |
| 6,789,230 B2 | 9/2004 | Katariya et al. |
| 6,804,665 B2 | 10/2004 | Kreulen et al. |
| 6,816,175 B1 | 11/2004 | Hamp et al. |
| 6,819,344 B2 | 11/2004 | Robbins |
| 6,823,333 B2 | 11/2004 | McGreevy |
| 6,826,724 B1 | 11/2004 | Shimacia et al. |
| 6,841,321 B2 | 1/2005 | Matsumoto et al. |
| 6,847,966 B1 | 1/2005 | Sommer et al. |
| 6,862,710 B1 | 3/2005 | Marchisio |
| 6,879,332 B2 | 4/2005 | Decombe |
| 6,880,132 B2 | 4/2005 | Uemura |
| 6,883,001 B2 | 4/2005 | Abe |
| 6,886,010 B2 | 4/2005 | Kostoff |
| 6,888,584 B2 | 5/2005 | Suzuki et al. |
| 6,915,308 B1 | 7/2005 | Evans et al. |
| 6,922,699 B2 | 7/2005 | Schuetze et al. |
| 6,941,325 B1 | 9/2005 | Benitez et al. |
| 6,968,511 B1 | 11/2005 | Robertson et al. |
| 6,970,881 B1 | 11/2005 | Mohan et al. |
| 6,970,931 B1 | 11/2005 | Bellamy et al. |
| 6,976,207 B1 | 12/2005 | Rujan et al. |
| 6,978,419 B1 | 12/2005 | Kantrowitz |
| 6,990,238 B1 | 1/2006 | Saffer et al. |
| 6,993,517 B2 | 1/2006 | Naito et al. |
| 6,993,535 B2 | 1/2006 | Bolle et al. |
| 6,996,575 B2 | 2/2006 | Cox et al. |
| 7,003,551 B2 | 2/2006 | Malik |
| 7,146,361 B2 | 2/2006 | Broder et al. |
| 7,013,435 B2 | 3/2006 | Gallo et al. |
| 7,020,645 B2 | 3/2006 | Bisbee et al. |
| 7,039,638 B2 | 5/2006 | Zhang et al. |
| 7,039,856 B2 | 5/2006 | Peairs et al. |
| 7,051,017 B2 | 5/2006 | Marchisio |
| 7,054,870 B2 | 5/2006 | Holbrook |
| 7,080,320 B2 | 7/2006 | Ono |
| 7,096,431 B2 | 8/2006 | Tambata et al. |
| 7,099,819 B2 | 8/2006 | Sakai et al. |
| 7,107,266 B1 | 9/2006 | Breyman et al. |
| 7,117,151 B2 | 10/2006 | Iwahashi et al. |
| 7,117,246 B2 | 10/2006 | Christenson et al. |
| 7,117,432 B1 | 10/2006 | Shanahan et al. |
| 7,130,807 B1 | 10/2006 | Mikurak |
| 7,131,060 B1 | 10/2006 | Azuma |
| 7,137,075 B2 | 11/2006 | Hoshito et al. |
| 7,139,739 B2 | 11/2006 | Agrafiotis et al. |
| 7,155,668 B2 | 12/2006 | Holland et al. |
| 7,158,957 B2 | 1/2007 | Joseph et al. |
| 7,188,107 B2 | 3/2007 | Moon et al. |
| 7,188,117 B2 | 3/2007 | Farahat et al. |
| 7,194,458 B1 | 3/2007 | Micaelian et al. |
| 7,194,483 B1 | 3/2007 | Mohan et al. |
| 7,197,497 B2 | 3/2007 | Cassock |
| 7,209,949 B2 | 4/2007 | Mousseau et al. |
| 7,233,843 B2 | 6/2007 | Budhraja et al. |
| 7,233,886 B2 | 6/2007 | Wegerich et al. |
| 7,233,940 B2 | 6/2007 | Bamberger et al. |
| 7,239,986 B2 | 7/2007 | Golub et al. |
| 7,240,199 B2 | 7/2007 | Tomkow |
| 7,246,113 B2 | 7/2007 | Cheetham et al. |
| 7,251,637 B1 | 7/2007 | Caid et al. |
| 7,266,365 B2 | 9/2007 | Ferguson et al. |
| 7,266,545 B2 | 9/2007 | Bergman et al. |
| 7,269,598 B2 | 9/2007 | Marchisio |
| 7,271,801 B2 | 9/2007 | Toyozawa et al. |
| 7,277,919 B1 | 10/2007 | Dohono et al. |
| 7,292,244 B2 | 11/2007 | Vafiadis et al. |
| 7,308,451 B1 | 12/2007 | Lamping et al. |
| 7,325,127 B2 | 1/2008 | Olkin et al. |
| 7,353,204 B2 | 4/2008 | Liu |
| 7,359,894 B1 | 4/2008 | Liebman et al. |
| 7,363,243 B2 | 4/2008 | Arnett et al. |
| 7,366,759 B2 | 4/2008 | Trevithick et al. |
| 7,373,612 B2 | 5/2008 | Risch et al. |
| 7,376,635 B1 | 5/2008 | Porcari et al. |
| 7,379,913 B2 | 5/2008 | Steele et al. |
| 7,383,282 B2 | 6/2008 | Whitehead et al. |
| 7,401,087 B2 | 7/2008 | Copperman et al. |
| 7,412,462 B2 | 8/2008 | Margolus et al. |
| 7,418,397 B2 | 8/2008 | Kojima et al. |
| 7,430,688 B2 | 9/2008 | Matsuno et al. |
| 7,430,717 B1 | 9/2008 | Spangler |
| 7,433,893 B2 | 10/2008 | Lowry |
| 7,440,662 B2 | 10/2008 | Antona et al. |
| 7,444,356 B2 | 10/2008 | Calistri-Yeh et al. |
| 7,457,948 B1 | 11/2008 | Bilicksa et al. |
| 7,472,110 B2 | 12/2008 | Achlioptas |
| 7,478,403 B1 | 1/2009 | Allavarpu |
| 7,490,092 B2 | 2/2009 | Morton et al. |
| 7,499,923 B2 | 3/2009 | Kawatani |
| 7,509,256 B2 | 3/2009 | Iwahashi et al. |
| 7,516,419 B2 | 4/2009 | Petro et al. |
| 7,519,565 B2 | 4/2009 | Prakash et al. |
| 7,523,349 B2 | 4/2009 | Barras |
| 7,558,769 B2 | 7/2009 | Scott et al. |
| 7,571,177 B2 | 8/2009 | Damle |
| 7,574,409 B2 | 8/2009 | Patinkin |
| 7,584,221 B2 | 9/2009 | Robertson et al. |
| 7,603,628 B2 | 10/2009 | Park et al. |
| 7,639,868 B1 | 12/2009 | Perrizo et al. |
| 7,640,219 B2 | 12/2009 | Perrizo |
| 7,647,345 B2 | 1/2010 | Trespess et al. |
| 7,668,376 B2 | 2/2010 | Lin et al. |
| 7,668,789 B1 | 2/2010 | Forman et al. |
| 7,698,167 B2 | 4/2010 | Batham et al. |
| 7,712,049 B2 | 5/2010 | Williams et al. |
| 7,716,223 B2 | 5/2010 | Haveliwala et al. |
| 7,730,425 B2 | 6/2010 | De los Reyes et al. |
| 7,743,059 B2 | 6/2010 | Chan et al. |
| 7,756,974 B2 | 7/2010 | Blumenau |
| 7,761,447 B2 | 7/2010 | Brill et al. |
| 7,801,841 B2 | 9/2010 | Mishra et al. |
| 7,831,928 B1 | 11/2010 | Rose et al. |
| 7,885,901 B2 | 2/2011 | Hull et al. |
| 7,899,274 B2 | 3/2011 | Baba et al. |
| 7,971,150 B2 | 6/2011 | Raskutti et al. |
| 7,984,014 B2 | 7/2011 | Song et al. |
| 8,010,466 B2 | 8/2011 | Patinkin |
| 8,010,534 B2 | 8/2011 | Roitblat et al. |
| 8,032,409 B1 | 10/2011 | Mikurak |
| 8,060,259 B2 | 11/2011 | Budhraja et al. |
| 8,065,156 B2 | 11/2011 | Gazdzinski |
| 8,065,307 B2 | 11/2011 | Haslam et al. |
| 8,165,974 B2 | 4/2012 | Privault et al. |
| 8,275,773 B2 | 9/2012 | Donnelly et al. |
| 8,290,778 B2 | 10/2012 | Gazdzinski |
| 8,296,146 B2 | 10/2012 | Gazdzinski |
| 8,296,666 B2 | 10/2012 | Wright et al. |
| 8,311,344 B2 | 11/2012 | Dunlop et al. |
| 8,326,823 B2 | 12/2012 | Grandhi et al. |
| 8,381,122 B2 | 2/2013 | Louch et al. |
| 8,401,710 B2 | 3/2013 | Budhraja et al. |

(56) References Cited

U.S. PATENT DOCUMENTS

| | | |
|---|---|---|
| 8,515,946 B2 | 8/2013 | Marcucci et al. |
| 8,676,605 B2 | 3/2014 | Familant |
| 8,712,777 B1 | 4/2014 | Gazdzinski |
| 8,719,037 B2 | 5/2014 | Gazdzinski |
| 8,719,038 B1 | 5/2014 | Gazdzinski |
| 8,781,839 B1 | 7/2014 | Gazdzinski |
| 8,819,569 B2 | 8/2014 | SanGiovanni et al. |
| 9,015,633 B2 | 4/2015 | Takamura et al. |
| 2002/0002556 A1 | 1/2002 | Yoshida et al. |
| 2002/0032735 A1 | 3/2002 | Burnstein et al. |
| 2002/0055919 A1 | 5/2002 | Mikheev |
| 2002/0065912 A1 | 5/2002 | Catchpole et al. |
| 2002/0078044 A1 | 6/2002 | Song et al. |
| 2002/0078090 A1 | 6/2002 | Hwang et al. |
| 2002/0122543 A1 | 9/2002 | Rowen |
| 2002/0184193 A1 | 12/2002 | Cohen |
| 2003/0018652 A1 | 1/2003 | Heckerman et al. |
| 2003/0046311 A1 | 3/2003 | Baidya et al. |
| 2003/0084066 A1 | 5/2003 | Waterman et al. |
| 2003/0110181 A1 | 6/2003 | Schuetze et al. |
| 2003/0120651 A1 | 6/2003 | Bernstein et al. |
| 2003/0130991 A1 | 7/2003 | Reijerse et al. |
| 2003/0172048 A1 | 9/2003 | Kauffman |
| 2003/0174179 A1 | 9/2003 | Suermondt et al. |
| 2004/0024739 A1 | 2/2004 | Copperman et al. |
| 2004/0024755 A1 | 2/2004 | Rickard |
| 2004/0034633 A1 | 2/2004 | Rickard |
| 2004/0078577 A1 | 4/2004 | Feng et al. |
| 2004/0083206 A1 | 4/2004 | Wu et al. |
| 2004/0090472 A1 | 5/2004 | Risch et al. |
| 2004/0133650 A1 | 7/2004 | Miloushev et al. |
| 2004/0163034 A1 | 8/2004 | Colbath |
| 2004/0181427 A1 | 9/2004 | Stobbs et al. |
| 2004/0205482 A1 | 10/2004 | Basu |
| 2004/0205578 A1 | 10/2004 | Wolf et al. |
| 2004/0215608 A1 | 10/2004 | Gourlay |
| 2004/0220895 A1 | 11/2004 | Carus et al. |
| 2004/0243556 A1 | 12/2004 | Ferrucci et al. |
| 2005/0004949 A1 | 1/2005 | Trepess et al. |
| 2005/0022106 A1* | 1/2005 | Kawai .............. G06F 17/30705 715/233 |
| 2005/0025357 A1 | 2/2005 | Landwehr et al. |
| 2005/0091211 A1* | 4/2005 | Vernau .................... G06F 16/30 |
| 2005/0097435 A1 | 5/2005 | Prakash et al. |
| 2005/0171772 A1 | 8/2005 | Iwahashi et al. |
| 2005/0203924 A1 | 9/2005 | Rosenberg |
| 2005/0283473 A1 | 12/2005 | Rousso et al. |
| 2006/0008151 A1 | 1/2006 | Lin et al. |
| 2006/0010145 A1 | 1/2006 | Al-Kofahi et al. |
| 2006/0012297 A1 | 1/2006 | Lee et al. |
| 2006/0021009 A1 | 1/2006 | Lunt |
| 2006/0053382 A1 | 3/2006 | Gardner et al. |
| 2006/0080311 A1 | 4/2006 | Potok et al. |
| 2006/0089924 A1* | 4/2006 | Raskutti ............... G06F 16/355 |
| 2006/0106847 A1 | 5/2006 | Eckardt et al. |
| 2006/0122974 A1 | 6/2006 | Perisic |
| 2006/0122997 A1 | 6/2006 | Lin |
| 2006/0164409 A1 | 7/2006 | Borchardt et al. |
| 2006/0242013 A1 | 10/2006 | Agarwal et al. |
| 2007/0020642 A1 | 1/2007 | Deng et al. |
| 2007/0043774 A1 | 2/2007 | Davis et al. |
| 2007/0044032 A1 | 2/2007 | Mollitor et al. |
| 2007/0112758 A1 | 5/2007 | Livaditis |
| 2007/0109297 A1 | 6/2007 | Borchardt et al. |
| 2007/0150801 A1 | 6/2007 | Chidlovskii et al. |
| 2007/0214133 A1 | 9/2007 | Liberty et al. |
| 2007/0288445 A1 | 12/2007 | Kraftsow |
| 2008/0005081 A1 | 1/2008 | Green et al. |
| 2008/0109762 A1 | 6/2008 | Hundal et al. |
| 2008/0140643 A1 | 6/2008 | Ismalon |
| 2008/0162478 A1 | 7/2008 | Pugh et al. |
| 2008/0183855 A1 | 7/2008 | Agarval et al. |
| 2008/0189273 A1 | 8/2008 | Kraftsow |
| 2008/0215427 A1 | 9/2008 | Kawada et al. |
| 2008/0228675 A1 | 9/2008 | Daffy et al. |
| 2008/0249999 A1 | 10/2008 | Renders et al. |
| 2008/0270946 A1 | 10/2008 | Risch et al. |
| 2009/0018995 A1 | 1/2009 | Chidlovskii et al. |
| 2009/0041329 A1 | 2/2009 | Nordell et al. |
| 2009/0043797 A1 | 2/2009 | Dorie |
| 2009/0049017 A1 | 2/2009 | Gross |
| 2009/0097733 A1 | 4/2009 | Hero et al. |
| 2009/0106239 A1 | 4/2009 | Getner et al. |
| 2009/0125505 A1 | 5/2009 | Bhalotia et al. |
| 2009/0222444 A1 | 9/2009 | Chowdhury et al. |
| 2009/0228499 A1 | 9/2009 | Schmidtler et al. |
| 2009/0228811 A1 | 9/2009 | Adams et al. |
| 2009/0259622 A1 | 10/2009 | Kolz et al. |
| 2009/0265631 A1 | 10/2009 | Sigurbjornsson et al. |
| 2009/0307213 A1 | 12/2009 | Deng et al. |
| 2010/0010968 A1 | 1/2010 | Redlich |
| 2010/0076857 A1 | 3/2010 | Deo et al. |
| 2010/0100539 A1 | 4/2010 | Davis et al. |
| 2010/0198802 A1 | 8/2010 | Kraftsow et al. |
| 2010/0250477 A1 | 9/2010 | Yadav |
| 2010/0250541 A1 | 9/2010 | Richards et al. |
| 2010/0262571 A1 | 10/2010 | Schmidtler et al. |
| 2010/0268661 A1 | 10/2010 | Levy et al. |
| 2010/0312725 A1 | 12/2010 | Privault et al. |
| 2011/0016118 A1 | 1/2011 | Edala et al. |
| 2012/0124034 A1 | 5/2012 | Jing et al. |

FOREIGN PATENT DOCUMENTS

| | | |
|---|---|---|
| EP | 1049030 | 11/2000 |
| WO | 2000067162 | 11/2000 |
| WO | 2003052627 | 6/2003 |
| WO | 2003060766 | 7/2003 |
| WO | 2006008733 | 7/2004 |
| WO | 2005073881 | 8/2005 |

OTHER PUBLICATIONS

McNee, "Meeting User Information Needs in Recommender Systems," Ph.D. Dissertation, University of Minnesota—Twin Cities, Jun. 2006.

Slaney, M., et al., "Multimedia Edges: Finding Hierarchy in all Dimensions" Proc. 9-th ACM Intl. Conf. on Multimedia, pp. 29-40, ISBN. 1-58113-394-4, Sep. 30, 2001, XP002295016 Ottawa (Sep. 3, 2001).

Strehl et al., "Cluster Ensembles—A Knowledge Reuse Framework for Combining Partitioning," Journal of Machine Learning Research, MIT Press, Cambridge, MA, US, ISSN: 1533-7928, vol. 3, No. 12, pp. 583-617, XP002390603 (Dec. 2002).

Sullivan, Dan., "Document Warehousing and Text Mining: Techniques for Improving Business Operations, Marketing and Sales," Ch. 1-3, John Wiley & Sons, New York, NY (2001).

V. Faber, "Clustering and the Continuous K-Means Algorithm," Los Alamos Science, The Laboratory, Los Alamos, NM, US, No. 22, Jan. 1, 1994, pp. 138-144 (Jan. 1, 1994).

Wang et al., "Learning text classifier using the domain concept hierarchy," Communications, Circuits and Systems and West Sino Expositions, IEEE 2002 International Conference on Jun. 29-Jul. 1, 2002, Piscataway, NJ, USA, IEEE, vol. 2, pp. 1230-1234 (2002).

Whiting et al., "Image Quantization: Statistics and Modeling," SPIE Conference of Physics of Medical Imaging, San Diego, CA, USA, vol. 3336, pp. 260-271 (Feb. 1998).

Ryall et al., "An Interactive Constraint-Based System for Drawing Graphs," UIST '97 Proceedings of the 10th Annual ACM Symposium on User Interface Software and Technology, pp. 97-104 (1997).

S.S. Weng, C.K. Liu, "Using text classification and multiple concepts to answer e-mails." Expert Systems with Applications, 26 (2004), pp. 529-543.

Kawano, Hiroyuki., "Overview of Mondou Web Search Engine Using Text Mining and Information Visualizing Technologies," IEEE, 2001, pp. 234-241.

Kazumasa Ozawa, "A Stratificational Overlapping Cluster Scheme," Information Science Center, Osaka Electro-communication University, Neyagawa-shi, Osaka 572, Japan, Pattern Recognition, vol. 18, pp. 279-286 (1985).

(56) References Cited

OTHER PUBLICATIONS

Kohonen, T., "Self-Organizing Maps," Ch. 1-2, Springer-Verlag (3rd ed.) (2001).
Kurimo M., "Fast Latent Semantic Indexing of Spoken Documents by Using Self-Organizing Maps" IEEE International Conference on Accoustics, Speech, and Signal Processing, vol. 6, pp. 2425-2428 (Jun. 2000).
Lam et al., "A Sliding Window Technique for Word Recognition," SPIE, vol. 2422, pp. 38-46, Center of Excellence for Document Analysis and Recognition, State University of New Yrok at Baffalo, NY, USA (1995).
Lio et al., "Funding Pathogenicity Islands and Gene Transfer Events in Genome Data," Bioinformatics, vol. 16, pp. 332-940, Department of Zoology, University of Cambridge, UK (Jan. 25, 2000).
Artero et al., "Viz3D: Effective Exploratory Visualization of Large Multidimensional Data Sets," IEEE Computer Graphics and Image Processing, pp. 340-347 (Oct. 20, 2004).
Magarshak, Greg., Theory & Practice. Issue 01. May 17, 2000. http://www.flipcode.com/articles/tp.sub.—issue01-pf.shtml (May 17, 2000).
Maria Cristin Ferreira de Oliveira et al., "From Visual Data Exploration to Visual Data Mining: A Survey," Jul.-Sep. 2003, IEEE Transactions on Visualization and Computer Graphics, vol. 9, No. 3, pp. 378-394 (Jul. 2003).
Rauber et al., "Text Mining in the SOMLib Digital Library System: The Representation of Topics and Genres," Applied Intelligence 18, pp. 271-293, 2003 Kluwer Academic Publishers (2003).
Miller et al., "Topic Islands: A Wavelet Based Text Visualization System," Proceedings of the IEEE Visualization Conference. 1998, pp. 189-196.
North et al. "A Taxonomy of Multiple Window Coordinations," Institute for Systems Research & Department of Computer Science, University of Maryland, Maryland, USA, http://www.cs.umd.edu/localphp/hcil/tech-reports-search.php?number=97-18 (1997).
Shuldberg et al., "Distilling Information from Text: The EDS TemplateFiller System," Journal of the American Society or Information Science, vol. 44, pp. 493-507 (1993).
Pelleg et al., "Accelerating Exact K-Means Algorithms With Geometric Reasoning," pp. 277-281, Conf on Knowledge Discovery in Data, Proc fifth ACM SIGKDD (1999).
R.E. Horn, "Communication Units, Morphology, and Syntax," Visual Language: Global Communication for the 21st Century, 1998, Ch. 3, pp. 51-92, MacroVU Press, Bainbridge Island, Washington, USA.
DeLoura et al., Game Programming Gems 2, Charles River Media, Inc., pp. 182-190, 2001.
Liu et al. "Robust Multi-Class Transdructive learning with graphs", Jun. 2009.
Paul N. Bennet et al., "Probabilistic Combination of Text Classifiers Using Reliability Indicators", 2002, ACM, 8 pages.
Salton G. et al., "Extended Boolean Information Retrieval" Communications of the Association for Computing Machinery, ACM, New York, NY, US., vol. 26, p. 12, Nov. 1, 1983, pig1022-1036, XP000670417.
Cutting, Douglass R., et al. "Scatter/gather: A cluster-based approach to browsing large document collections." Proceedings of the 15th annual international ACM SIGIR conference on Research and development in information retrieval. ACM, 1992.
Anna Sachinopoulou, "Multidimensional Visualization," Technical Research Centre of Finland, ESPOO 2001, VTT Research Notes 2114, pp. 1-37 (2001).

B.B. Hubbard, "The World According the Wavelet: The Story of a Mathematical Technique in the Making," AK Peters (2nd ed.), pp. 227-229, Massachusetts, USA (1998).
Baeza-Yates et al., "Modern Information Retrieval," Ch. 2 "Modeling," Modern Information Retrieval, Harlow: Addison-Wesley, Great Britain 1999, pp. 18-71 (1999).
Bernard et al.: "Labeled Radial Drawing of Data Structures" Proceedings of the Seventh International Conference on Information Visualization, Infovis. IEEE Symposium, Jul. 16-18, 2003, Piscataway, NJ, USA, IEEE, Jul. 16, 2003, pp. 479-484, XP010648809, IS.
Bier et al. "Toolglass and Magic Lenses: The See-Through Interface", Computer Graphics Proceedings, Proceedings of Siggraph Annual International Conference on Computer Graphics and Interactive Techniques, pp. 73-80, XP000879378 (Aug. 1993).
Boukhelifa et al., "A Model and Software System for Coordinated and Multiple Views in Exploratory Visualization," Information Visualization, No. 2, pp. 258-269, GB (2003).
C. Yip Chung et al., "Thematic Mapping—From Unstructured Documents to Taxonomies," CIKM'02, Nov. 4-9, 2002, pp. 608-610, ACM, McLean, Virginia, USA (Nov. 4, 2002).
Chen An et al., "Fuzzy Concept Graph and Application in Web Document Clustering," IEEE, pp. 101-106 (2001).
Davison et al., "Brute Force Estimation of the Number of Human Genes Using EST Clustering as a Measure," IBM Journal of Research & Development, vol. 45, pp. 439-447 (May 2001).
Eades et al. "Multilevel Visualization of Clustered Graphs," Department of Computer Science and Software Engineering, University of Newcastle, Australia, Proceedings of Graph Drawing '96, Lecture Notes in Computer Science, NR. 1190, Sep. 18, 1996-Se.
Eades et al., "Orthogonal Grid Drawing of Clustered Graphs," Department of Computer Science, the University of Newcastle, Australia, Technical Report 96-04, [Online] 1996, Retrieved from the internet: URL:http://citeseer.ist.psu.edu/eades96ort hogonal.ht.
Estivill-Castro et al. "Amoeba: Hierarchical Clustering Based on Spatial Proximity Using Delaunaty Diagram", Department of Computer Science, The University of Newcastle, Australia, 1999 ACM SIGMOD International Conference on Management of Data, vol. 28, N.
F. Can, Incremental Clustering for Dynamic Information Processing: ACM Transactions on Information Systems, ACM, New York, NY, US, vol. 11, No. 2, pp. 143-164, XP-002308022 (Apr. 1993).
Fekete et al., "Excentric Labeling: Dynamic Neighborhood Labeling for Data Visualization," CHI 1999 Conference Proceedings Human Factors in Computing Systems, Pittsburgh, PA, pp. 512-519 (May 15-20, 1999).
http://em-ntserver.unl.edu/Math/mathweb/vecors/vectors.html© 1997.
Inxight VizServer, "Speeds and Simplifies the Exploration and Sharing of Information", www.inxight.com/products/vizserver, copyright 2005.
Jain et al., "Data Clustering: A Review," ACM Computing Surveys, vol. 31, No. 3, Sep. 1999, pp. 264-323, New York, NY, USA (Sep. 1999).
James Osborn et al., "JUSTICE: A Jidicial Search Tool Using Intelligent Cencept Extraction," Department of Computer Science and Software Engineering, University of Melbourne, Australia, ICAIL-99, 1999, pp. 173-181, ACM (1999).
Jiang Linhui, "K-Mean Algorithm: Iterative Partitioning Clustering Algorithm," http://www.cs.regina.ca/-linhui/K.sub.—mean.sub.—algorithm.html, (2001) Computer Science Department, University of Regina, Saskatchewan, Canada (2001).
Kanungo et al., "The Analysis of a Simple K-Means Clustering Algorithm," pp. 100-109, Proc 16th annual symposium of computational geometry (May 2000).

\* cited by examiner

70

90

100

120

COMPUTER-IMPLEMENTED SYSTEM AND METHOD FOR GENERATING DOCUMENT TRAINING SETS

CROSS-REFERENCE TO RELATED APPLICATION

This patent application is a continuation of U.S. Pat. No. 9,489,446, issued Nov. 8, 2016, which is a divisional of U.S. Pat. No. 8,612,446, issued Dec. 17, 2013, which claims priority under 35 U.S.C. § 119(e) to U.S. Provisional Patent Application, Ser. No. 61/236,490, expired, the disclosures of which are incorporated by reference.

FIELD

The invention relates in general to information retrieval and, specifically, to a computer-implemented system and method for generating document training sets.

BACKGROUND

Document review is an activity frequently undertaken in the legal field during the discovery phase of litigation. Typically, document classification requires reviewers to assess the relevance of documents to a particular topic as an initial step. Document reviews can be conducted manually by human reviewers, automatically by a machine, or by a combination of human reviewers and a machine.

Generally, trained reviewers analyze documents and provide a recommendation for classifying each document in regards to the particular legal issue being litigated. A set of exemplar documents is provided to the reviewer as a guide for classifying the documents. The exemplar documents are each previously classified with a particular code relevant to the legal issue, such as "responsive," "non-responsive," and "privileged." Based on the exemplar documents, the human reviewers or machine can identify documents that are similar to one or more of the exemplar documents and assign the code of the exemplar document to the uncoded documents.

The set of exemplar documents selected for document review can dictate results of the review. A cohesive representative exemplar set can produce accurately coded documents, while effects of inaccurately coded documents can be detrimental to a legal proceeding. For example, a "privileged" document contains information that is protected by a privilege, meaning that the document should not be disclosed to an opposing party. Disclosing a "privileged" document can result in an unintentional waiver of privilege to the subject matter.

The prior art focuses on document classification and generally assumes that exemplar documents are already defined and exist as a reference set for use in classifying document. Such classification can benefit from having better reference sets generated to increase the accuracy of classified documents.

Thus, there remains a need for a system and method for generating a set of exemplar documents that are cohesive and which can serve as an accurate and efficient example for use in classifying documents.

SUMMARY

A system and method for providing generating reference sets for use during document review is provided. A collection of unclassified documents is obtained. Selection criteria are applied to the document collection and those unclassified documents that satisfy the selection criteria are selected as reference set candidates. A classification code is assigned to each reference set candidate. A reference set is formed from the classified reference set candidates. The reference set is quality controlled and shared between one or more users.

A further embodiment provides a computer-implemented system and method for generating document training sets. Unclassified documents are provided to two or more classifiers. A classification code assigned to each unclassified document is received. A determination is made as to whether a disagreement exists between classification codes assigned to a common unclassified document via different classifiers. The common unclassified document with a disagreement in classification codes are provided for further review. Results of the further review include one of a new classification code and confirmation of one of the assigned classification codes. The unclassified documents for which a disagreement exists are grouped as a training set.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

Reference documents are each associated with a classification code and are selected as exemplar documents or a "reference set" to assist human reviewers or a machine to identify and code unclassified documents. The quality of a reference set can dictate the results of a document review project and an underlying legal proceeding or other activity. Use of a noncohesive or "bad" reference set can provide inaccurately coded documents and could negatively affect a pending legal issue during, for instance, litigation. Generally, reference sets should be cohesive for a particular issue or topic and provide accurate guidance to classifying documents.

Figure 1:
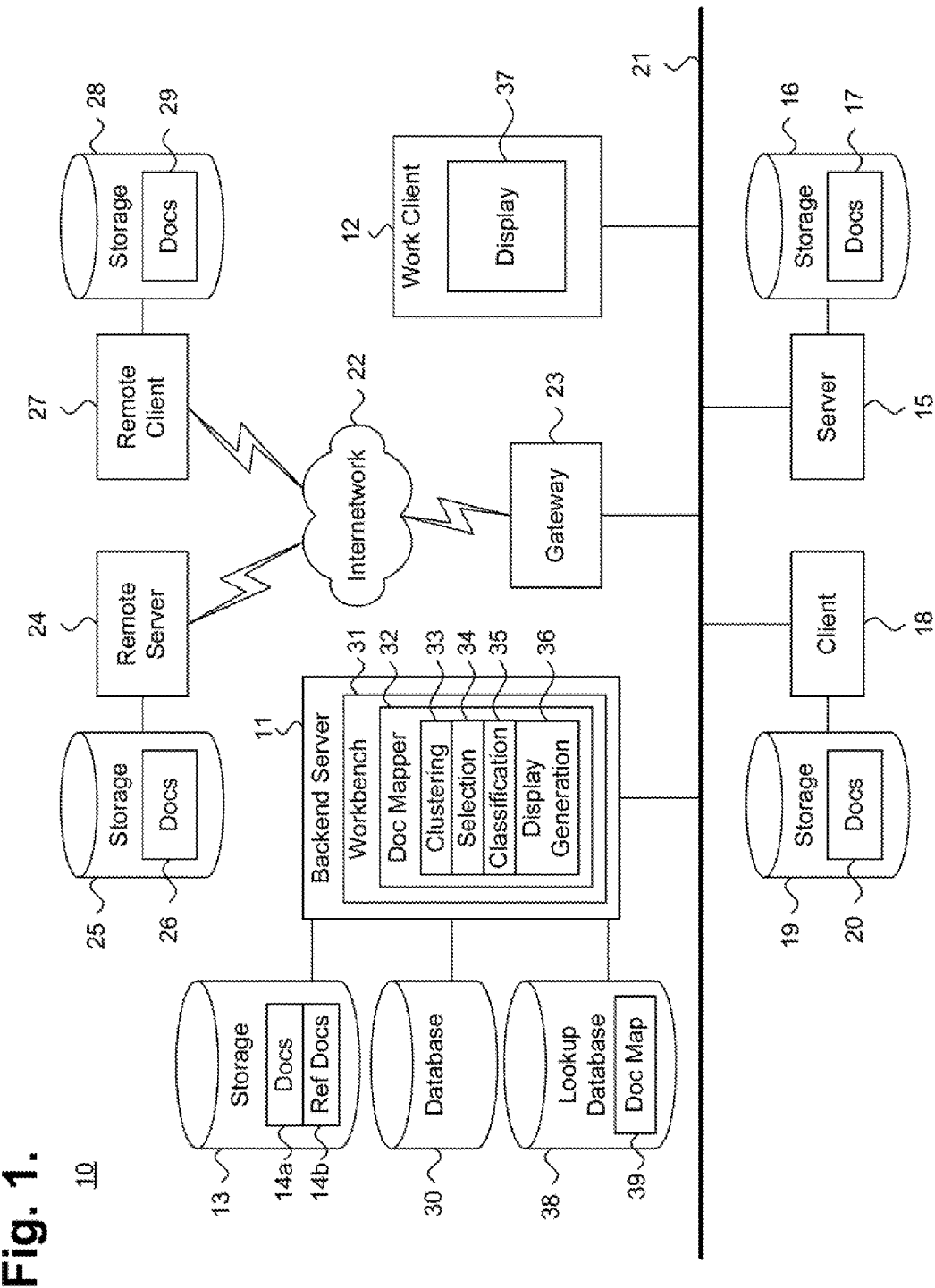
FIG. 1 is a block diagram showing a system for generating a reference set for use during document review, in accordance with one embodiment.

Cohesive reference set generation requires a support environment to review, analyze, and select appropriate documents for inclusion in the reference set. FIG. 1 is a block diagram showing a system for generating a reference set for use in classifying documents, in accordance with one embodiment. By way of illustration, the system 10 operates in a distributed computing environment, including "cloud environments," which include a plurality of systems and sources. A backend server 11 is coupled to a storage device 13, a database 30 for maintaining information about the documents, and a lookup database 38 for storing many-to-many mappings 39 between documents and document features, such as concepts. The storage device 13 stores documents 14a and reference sets 14b. The documents 14a can include uncoded or "unclassified" documents and coded or "classified" documents, in the form of structured or unstructured data. Hereinafter, the terms "classified" and "coded" are used interchangeably with the same intended meaning, unless otherwise indicated.

The uncoded and coded documents can be related to one or more topics or legal issues. Uncoded documents are analyzed and assigned a classification code during a document review, while coded documents that have been previously reviewed and associated with a classification code. The storage device 13 also stores reference documents 14b, which together form a reference set of trusted and known results for use in guiding document classification. A set of reference documents can be hand-selected or automatically selected, as discussed infra.

Reference sets can be generated for one or more topics or legal issues, as well as for any other data to be organized and classified. For instance, the topic can include data regarding a person, place, or object. In one embodiment, the reference set can be generated for a legal proceeding based on a filed complaint or other court or administrative filing or submission. Documents in the reference set 14b are each associated with an assigned classification code and can highlight important information for the current topic or legal issue. A reference set can include reference documents with different classification codes or the same classification code. Core reference documents most clearly exhibit the particular topic or legal matter, whereas boundary condition reference documents include information similar to the core reference documents, but which are different enough to require assignment of a different classification code.

Once generated, the reference set can be used as a guide for classifying uncoded documents, such as described in commonly-assigned U.S. Pat. No. 8,713,018, issued on Apr. 29, 2014; U.S. Pat. No. 8,515,957, issued on Aug. 20, 2013; U.S. Pat. No. 8,572,084, issued on Oct. 29, 2013; and U.S. Pat. No. 8,632,223, issued on Jan. 21, 2014 the disclosures of which are incorporated by reference.

In a further embodiment, a reference set can also be generated based on features associated with the document. The feature reference set can be used to identify uncoded documents associated with the reference set features and provide classification suggestions, such as described in commonly-assigned U.S. Pat. No. 8,700,627, issued on Apr. 15, 2014; U.S. Pat. No. 9,477,751, issued on Oct. 25, 2016; U.S. Pat. No. 8,645,378, issued on Feb. 4, 2014; and U.S. Pat. No. 8,515,958, issued on Aug. 20, 2013, the disclosures of which are incorporated by reference.

The backend server 11 is also coupled to an intranetwork 21 and executes a workbench suite 31 for providing a user interface framework for automated document management, processing, analysis, and classification. In a further embodiment, the backend server 11 can be accessed via an internetwork 22. The workbench software suite 31 includes a document mapper 32 that includes a clustering engine 33, selector 34, classifier 35, and display generator 36. Other workbench suite modules are possible. In a further embodiment, the clustering engine, selector, classifier, and display generator can be provided independently of the document mapper.

The clustering engine 33 performs efficient document scoring and clustering of uncoded documents and reference documents, such as described in commonly-assigned U.S. Pat. No. 7,610,313, issued on Oct. 27, 2009, the disclosure of which is incorporated by reference. The uncoded documents 14a can be grouped into clusters and one or more documents can be selected from at least one cluster to form reference set candidates, as further discussed below in detail with reference to FIGS. 4 and 5. The clusters can be organized along vectors, known as spines, based on a similarity of the clusters. The selector 34 applies predetermined criteria to a set of documents to identify candidates for inclusion in a reference set, as discussed infra. The classifier 35 provides a machine-generated classification code suggestion and confidence level for coding of selected uncoded documents.

The display generator 36 arranges the clusters and spines in thematic neighborhood relationships in a two-dimensional visual display space. Once generated, the visual display space is transmitted to a work client 12 by the backend server 11 via the document mapper 32 for presenting to a human reviewer. The reviewer can include an individual person who is assigned to review and classify one or more uncoded documents by designating a code. Other types of reviewers are possible, including machine-implemented reviewers.

The document mapper 32 operates on uncoded documents 14a, which can be retrieved from the storage 13, as well as from a plurality of local and remote sources. As well, the local and remote sources can also store the reference documents 14b. The local sources include documents 17 maintained in a storage device 16 coupled to a local server 15 and documents 20 maintained in a storage device 19 coupled to a local client 18. The local server 15 and local client 18 are interconnected to the backend server 11 and the work client 12 over an intranetwork 21. In addition, the document mapper 32 can identify and retrieve documents from remote sources over an internetwork 22, including the Internet, through a gateway 23 interfaced to the intranetwork 21. The remote sources include documents 26 maintained in a storage device 25 coupled to a remote server 24 and documents 29 maintained in a storage device 28 coupled to a remote client 27. Other document sources, either local or remote, are possible.

The individual documents 14a, 14b, 17, 20, 26, 29 include all forms and types of structured and unstructured data, including electronic message stores, word processing documents, electronic mail (email) folders, Web pages, and graphical or multimedia data. Notwithstanding, the documents could be in the form of structurally organized data, such as stored in a spreadsheet or database.

In one embodiment, the individual documents 14a, 14b, 17, 20, 26, 29 include electronic message folders storing email and attachments, such as maintained by the Outlook and Windows Live Mail products, licensed by Microsoft Corporation, Redmond, Wash. The database can be an SQL-based relational database, such as the Oracle database management system, Release 11, licensed by Oracle Corporation, Redwood Shores, Calif. Further, the individual documents 17, 20, 26, 29 can be stored in a "cloud," such as in Windows Live Hotmail, licensed by Microsoft Corporation, Redmond, Wash. Additionally, the individual documents 17, 20, 26, 29 include uncoded documents and reference documents.

The system 10 includes individual computer systems, such as the backend server 11, work server 12, server 15, client 18, remote server 24 and remote client 27. The individual computer systems are general purpose, programmed digital computing devices that have a central processing unit (CPU), random access memory (RAM), non-volatile secondary storage, such as a hard drive or CD ROM drive, network interfaces, and peripheral devices, including user interfacing means, such as a keyboard and display. Program code, including software programs, and data are loaded into the RAM for execution and processing by the CPU and results are generated for display, output, transmittal, or storage.

Figure 2:
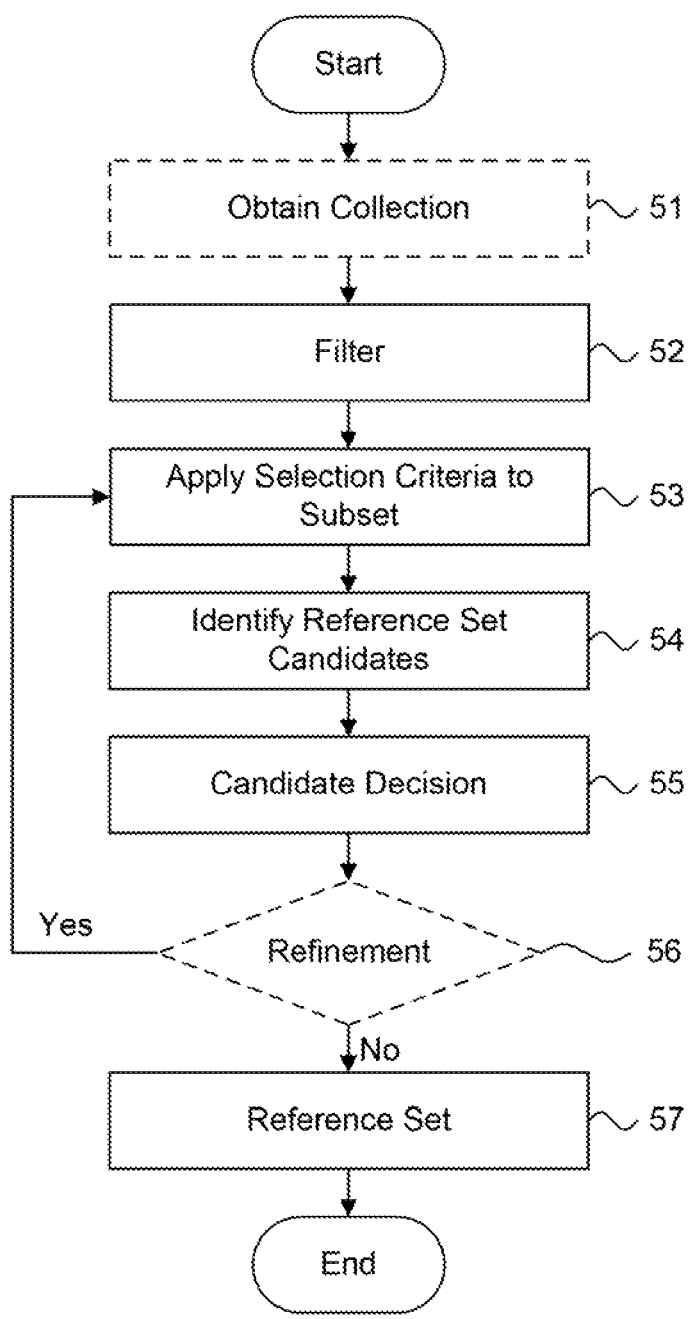
FIG. 2 is a flow diagram showing a method for generating a reference set for use during document review, in accordance with one embodiment.

Reference set candidates selected for inclusion in a reference set are identified using selection criteria, which can reduce the number of documents for selection. FIG. 2 is a flow diagram showing a method for generating a reference set for use in document review, in accordance with one embodiment. A collection of documents is obtained (block 51). The collection of documents can include uncoded documents selected from a current topic or legal matter, previously coded documents selected from a related topic or legal matter, or pseudo documents. Pseudo documents are created using knowledge obtained by a person familiar with the issue or topic that is converted into a document. For example, a reviewer who participated in a verbal conversation with a litigant or other party during which specifics of a lawsuit were discussed could create a pseudo document based on the verbal conversation. A pseudo document can exist electronically or in hardcopy form. In one embodiment, the pseudo document is created specifically for use during the document review. Other types of document collections are possible.

Filter criteria are optionally applied to the document collection to identify a subset of documents (block 52) for generating the reference set. The filter criteria can be based on metadata associated with the documents, including date, file, folder, custodian, or content. Other filter criteria are possible. In one example, a filter criteria could be defined as "all documents created after 1997;" and thus, all documents that satisfy the filter criteria are selected as a subset of the document collection.

The filter criteria can be used to reduce the number of documents in the collection. Subsequently, selection criteria are applied to the document subset (block 53) to identify those documents that satisfy the selection criteria as candidates (block 54) for inclusion in the reference set. The selection criteria can include clustering, feature identification, assignments or random selection, and are discussed in detail below with reference to FIG. 3. A candidate decision is applied (block 55) to the reference set candidates to identify the reference candidates for potential inclusion in the reference set (block 57). During the candidate decision, the reference set candidates are analyzed and a classification code is assigned to each reference set candidate. A human reviewer or machine can assign the classification codes to the reference set candidates based on features of each candidate. The features include pieces of information that described the document candidate, such as entities, metadata, and summaries, as well as other information. Coding instructions guide the reviewer or machine to assign the correct classification code using the features of the reference set candidates. The coding instructions can be provided by a reviewer, a supervisor, a law firm, a party to a legal proceeding, or a machine. Other sources of the coding instructions are possible.

Also, a determination as to whether that reference set candidate is a suitable candidate for including in the reference set is made. Once the reference set candidates are coded, each candidate is analyzed to ensure that candidates selected for the reference set cover or "span" the largest area of feature space provided by the document collection. In one embodiment, the candidates that are most dissimilar from all the other candidates are selected as the reference set. A first reference set candidate is selected and placed in a list. The remaining reference set candidates are compared to the first reference set candidate in the list and the candidate most dissimilar to all the listed candidates is also added to the list. The process continues until all the dissimilar candidates have been identified or other stop criteria have been satisfied. The stop criteria can include a predetermined number of dissimilar reference set criteria, all the candidates have been reviewed, or a measure of the most dissimilar document fails to satisfy a dissimilarity threshold. Identifying dissimilar documents is discussed in the paper, Sean M. McNee. "Meeting User Information Needs in Recommender Systems". Ph.D. Dissertation, University of Minnesota-Twin Cities. Jun. 2006, which is hereby incorporated by reference. Other stop criteria are possible.

However, refinement (block 56) of the reference set candidates can optionally occur prior to selection of the reference set. The refinement assists in narrowing the number of reference set candidates used to generate a reference set of a particular size or other criteria. If refinement is to occur, further selection criteria are applied (block 53) to the reference set candidates and a further iteration of the process steps occurs. Each iteration can involve different selection criteria. For example, clustering criteria can be applied during a first pass and random sampling can be applied during a second pass to identify reference set candidates for inclusion in the reference set.

In a further embodiment, features can be used to identify documents for inclusion in a reference set. A collection of documents is obtained and features are identified from the document collection. The features can be optionally filtered to reduce the feature set and subsequently, selection criteria can be applied to the features. The features that satisfy the selection criteria are selected as reference set candidate features. A candidate decision, including assigning classification codes to each of the reference set candidate features, is applied. Refinement of the classified reference set candidate features is optionally applied to broaden or narrow the reference set candidate features for inclusion in the reference set. The refinement can include applying further selection criteria to reference set documents during a second iteration. Alternatively, the selection criteria can first be applied to documents and in a further iteration; the selection criteria are applied to features from the documents. Subsequently, documents associated with the reference set candidate features are grouped as the reference set.

Figure 3:
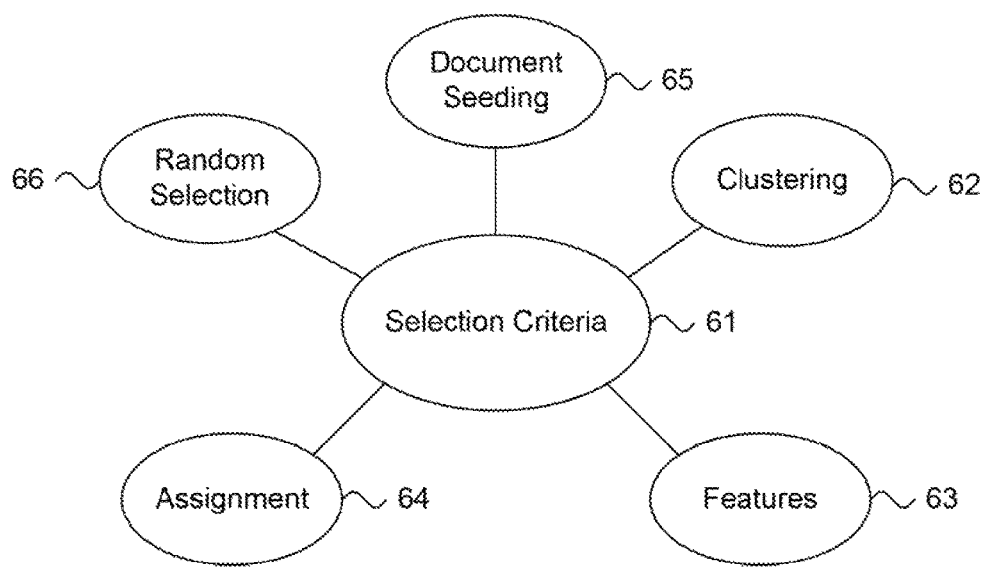
FIG. 3 is a data flow diagram showing examples of the selection criteria of FIG. 2.

The candidate criteria can be applied to a document set to identify reference set candidates for potential inclusion in the reference set. FIG. 3 is a data flow diagram 60 showing examples of the selection criteria of FIG. 2. The selection criteria 61 include clustering 62, features 63, assignments 64, document seeding 65, and random sampling 66. Other selection criteria are possible. Clustering 62 includes grouping documents by similarity and subsequently selecting documents from one or more of the clusters. A number of documents to be selected can be predetermined by a reviewer or machines, as further described below with reference to FIGS. 4 and 5. Features 63 include metadata about the documents, including nouns, noun phrases, length of document, "To" and "From" fields, date, complexity of sentence structure, and concepts. Assignments 64 include a subset of documents selected from a larger collection of uncoded document to be reviewed. The assignments can be generated based on assignment criteria, such as content, size, or number of reviewers. Other features, assignments, and assignment criteria are possible.

Document seeding 65 includes selecting one or more seed documents and identifying documents similar to the seed documents from a larger collection of documents as reference set candidates. Document seeding is further discussed below in detail with reference to FIG. 6. Random sampling 66 includes randomly selecting documents from a larger collection of documents as reference set candidates. Random sampling is further discussed below in detail with reference to FIG. 7.

Figure 4:
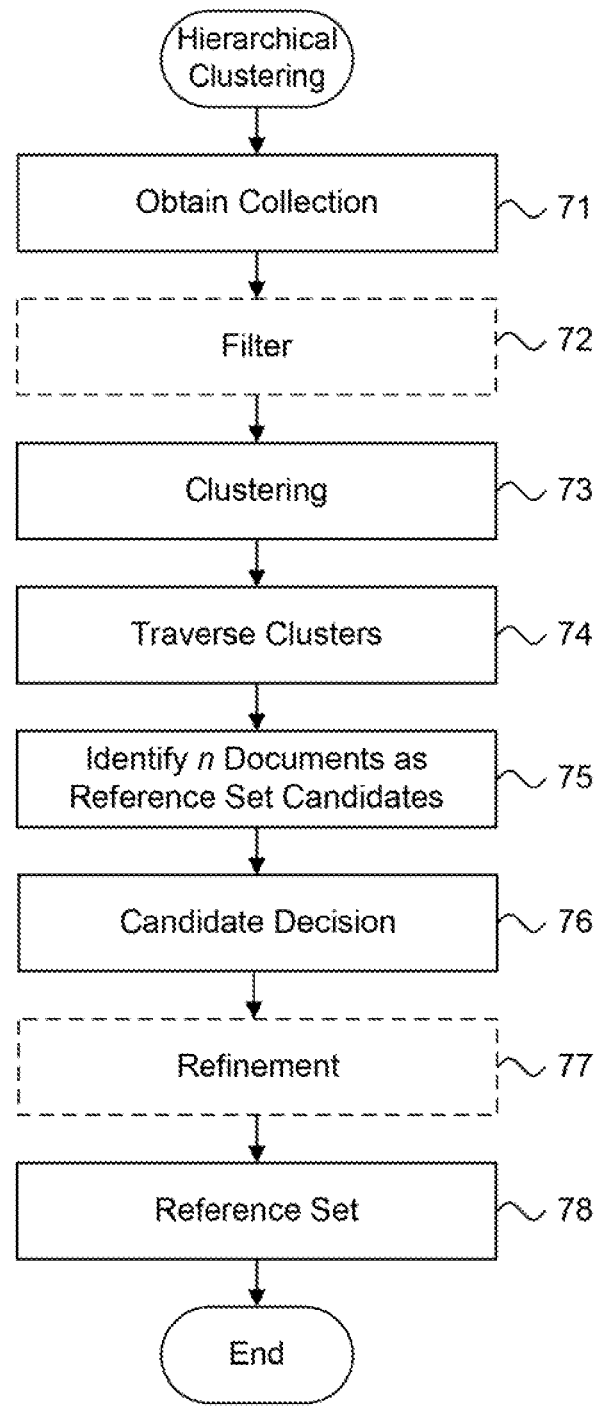
FIG. 4 is a flow diagram showing, by way of example, a method for generating a reference set via hierarchical clustering.

The process for generating a reference set can be iterative and each pass through the process can use different selection criteria, as described above with reference to FIG. 2. Alternatively, a single pass through the process using only one selection criteria to generate a cohesive reference set is also possible. Use of the clustering selection criteria can identify and group documents by similarity. FIG. 4 is a flow diagram showing, by way of example, a method for generating a reference set via hierarchical clustering. A collection of documents is obtained (block 71) and filter criteria can optionally be applied to reduce a number of the documents (block 72). The documents are then clustered (block 73) to generate a hierarchical tree via hierarchical clustering. Hierarchical clustering, including agglomerative or divisive clustering, can be used to generate the clusters of documents, which can be used to identify a set of reference documents having a particular predetermined size. During agglomerative clustering, each document is assigned to a cluster and similar clusters are combined to generate the hierarchical tree. Meanwhile, during divisive clustering, all the documents are grouped into a single cluster and subsequently divided to generate the hierarchical tree.

The clusters of the hierarchical tree can be traversed (block 74) to identify n-documents as reference set candidates (block 75). The n-documents can be predetermined by a user or a machine. In one embodiment, the n-documents are influential documents, meaning that a decision made for the n-document, such as the assignment of a classification code, can be propagated to other similar documents. Using influential documents can improve the speed and classification consistency of a document review.

To obtain the n-documents, n-clusters can be identified during the traversal of the hierarchical tree and one document from each of the identified clusters can be selected. The single document selected from each cluster can be the document closest to the cluster center or another documents. Other values of n are possible, such as n/2. For example, n/2 clusters are identified during the traversal and two documents are selected from each identified cluster. In one embodiment, the selected documents are the document closest to the cluster center and the document furthest from the cluster center. However, other documents can be selected, such as randomly picked documents.

Once identified, the reference set candidates are analyzed and a candidate decision is made (block 76). During the analysis, a classification code is assigned to each reference set candidate and a determination of whether that reference set candidate is appropriate for the reference set is made. If one or more of the reference set candidates are not sufficient for the reference set, refinement of the reference set candidates may optionally occur (block 77) by reclustering the reference set candidates (block 73). Refinement can include changing input parameters of the clustering process and then reclustering the documents, changing the document collection by filtering different documents, or selecting a different subset of n-documents from the clusters. Other types of and processes for refinement are possible. The refinement assists in narrowing the number of reference set candidates to generate a reference set of a particular size during which reference set candidates can be added or removed. One or more of the reference set candidates are grouped to form the reference set (block 78). The size of the reference set can be predetermined by a human reviewer or a machine.

In a further embodiment, features can be used to identify documents for inclusion in a reference set. A collection of documents is obtained and features from the documents are identified. Filter criteria can optionally be applied to the features to reduce the number of potential documents for inclusion in the reference set. The features are then grouped into clusters, which are traversed to identify n-features as reference set candidate features. A candidate decision, including the assignment of classification codes, is applied to each of the reference set candidate features and refinement of the features is optional. Documents associated with the classified reference set candidate features are then grouped as the reference set.

Figure 5:
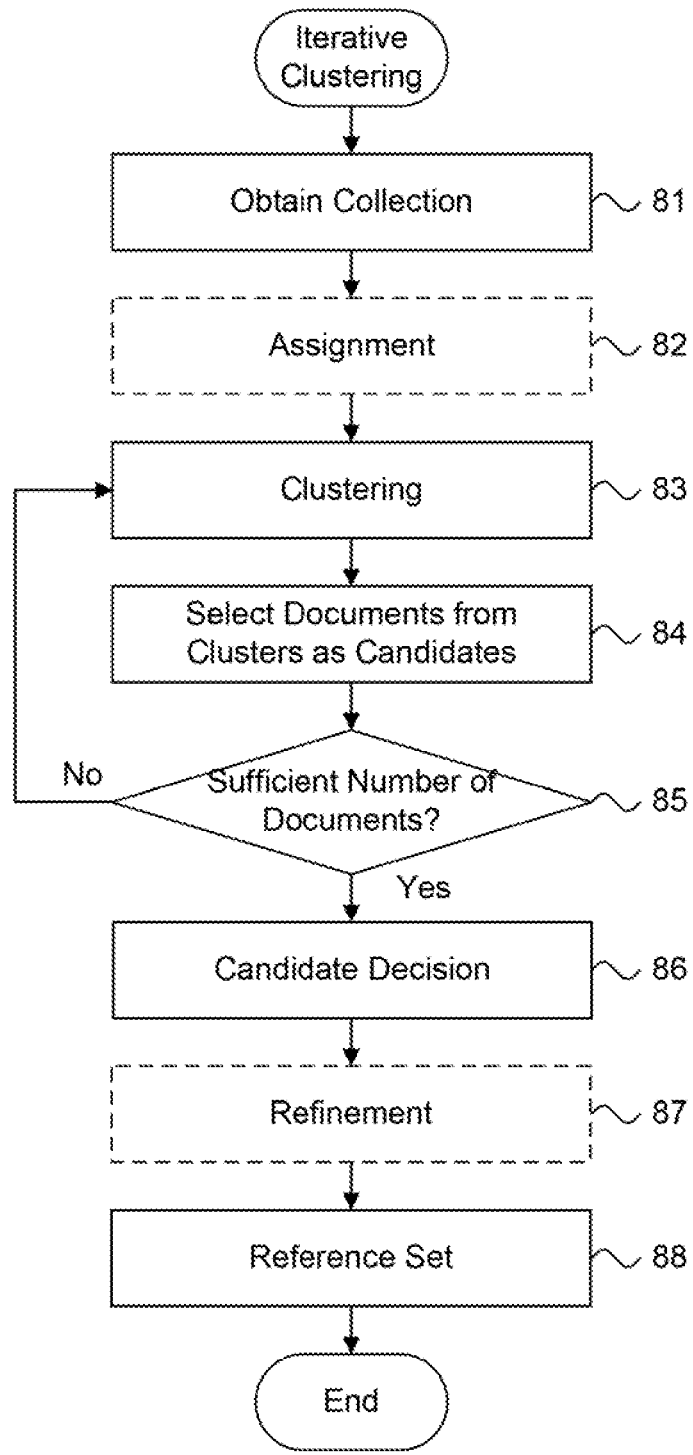
FIG. 5 is a flow diagram showing, by way of example, a method for generating a reference set via iterative clustering.

Iterative clustering is a specific type of hierarchical clustering that provides a reference set of documents having an approximate size. FIG. 5 is a flow diagram showing, by way of example, a method for generating a reference set via iterative clustering. A collection of documents is obtained (block 81). The documents can be optionally divided into assignments (block 82), or groups of documents, based on document characteristics, including metadata about the document. In general, existing knowledge about the document is used to generate the assignments. Other processes for generating the assignments are possible. In one embodiment, attachments to the document can be included in the same assignment as the document, and in an alternative embodiment, the attachments are identified and set aside for review or assigned to a separate assignment. The documents are then grouped into clusters (block 83). One or more documents can be selected from the clusters as reference set candidates (block 84). In one embodiment, two documents are selected, including the document closest to the cluster center and the document closest to the edge of the cluster. The document closest to the center provides information regarding the center of the cluster, while the outer document provides information regarding the edge of the cluster. Other numbers and types of documents can be selected.

The selected documents are then analyzed to determine whether a sufficient number of documents have been identified as reference set candidates (block 85). The number of documents can be based on a predefined value, threshold, or bounded range selected by a reviewer or a machine. If a sufficient number of reference set candidates are not identified, further clustering (block 83) is performed on the reference set candidates until a sufficient number of reference set candidates exists. However, if a sufficient number of reference set candidates are identified, the candidates are analyzed and a candidate decision is made (block 86). For example, a threshold can define a desired number of documents for inclusion in the reference set. If the number of reference set candidates is equal to or below the threshold, those candidates are further analyzed, whereas if the number of reference set candidates is above the threshold, further clustering is performed until the number of candidates is sufficient. In a further example, a bounded range, having an upper limitation and a lower limitation, is determined and if the number of reference set candidates falls within the bounded range, those reference set candidates are further analyzed.

The candidate decision includes coding of the documents and a determination as to whether each reference set candidate is a good candidate for inclusion in the reference set. The coded reference set candidates form the reference set (block 87). Once formed, the reference set can be used as a group of exemplar documents to classify uncoded documents.

In a further embodiment, features can be used to identify documents for inclusion in the reference set. A collection of documents is obtained and features are identified within the documents. The features can optionally be divided into one or more assignments. The features are then grouped into clusters and at least one feature is selected from one or more of the clusters. The selected features are compared with a predetermined number of documents for inclusion in the reference set. If the predetermined number is not satisfied, further clustering is performed on the features to increase or reduce the number of features. However, if satisfied, the selected features are assigned classification codes. Refinement of the classified features is optional. Subsequently, documents associated with the classified features are identified and grouped as the reference set.

Figure 6:
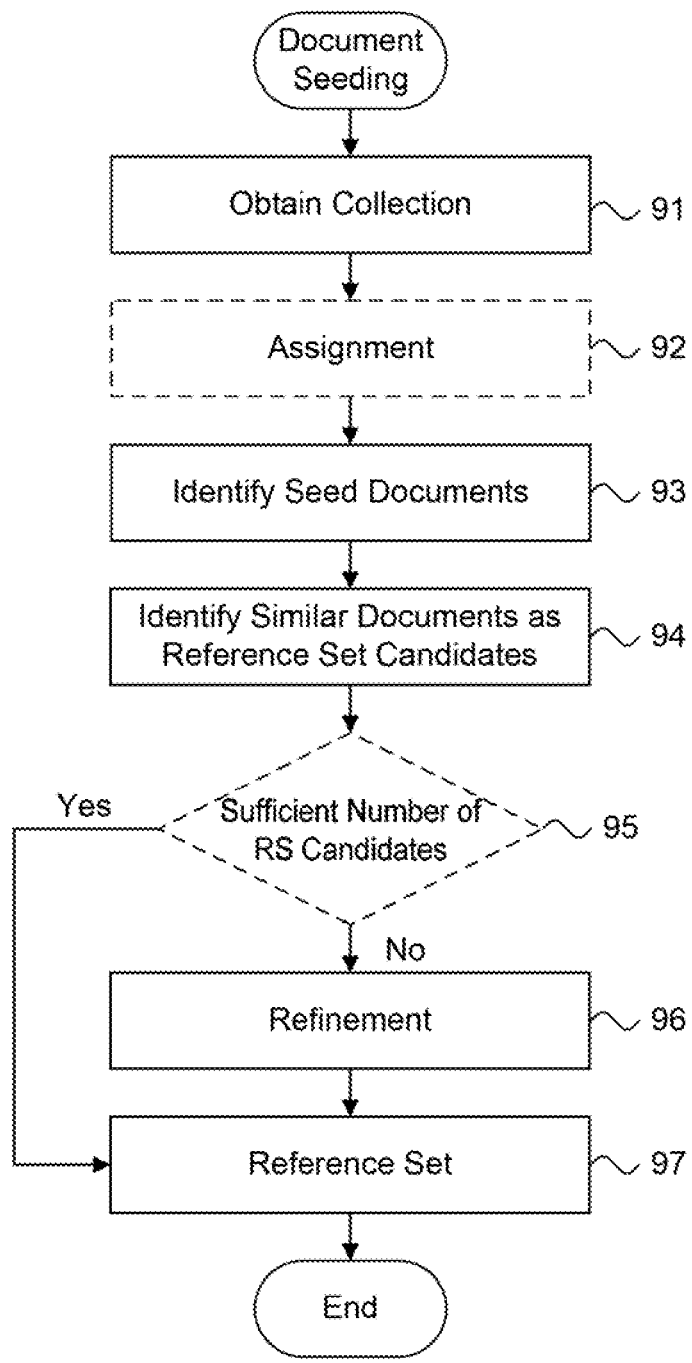
FIG. 6 is a flow diagram showing, by way of example, a method for generating a reference set via document seeding.

The selection criteria used to identify reference set candidates can include document seeding, which also groups similar documents. FIG. 6 is a flow diagram showing, by way of example, a method for generating a reference set via document seeding. A collection of documents is obtained (block 91). The collection of documents includes unmarked documents related to a topic, legal matter, or other theme or purpose. The documents can be optionally grouped into individual assignments (block 92). One or more seed documents are identified (block 93). The seed documents are considered to be important to the topic or legal matter and can include documents identified from the current matter, documents identified from a previous matter, or pseudo documents.

The seed documents from the current case can include the complaint filed in a legal proceeding for which documents are to be classified or other documents, as explained supra. Alternatively, the seed documents can be quickly identified using a keyword search or knowledge obtained from a reviewer. In a further embodiment, the seed documents can be identified as reference set candidates identified in a first pass through the process described above with reference to FIG. 2. The seed documents from a previous related matter can include one or more of the reference documents from the reference set generated for the previous matter. The pseudo documents use knowledge from a reviewer or other user, such as a party to a lawsuit, as described above with reference to FIG. 2.

The seed documents are then applied to the document collection or at least one of the assignments and documents similar to the seed documents are identified as reference set candidates (block 94). In a further embodiment, dissimilar documents can be identified as reference set candidates. In yet a further embodiment, the similar and dissimilar documents can be combined to form the seed documents. The similar and dissimilar documents can be identified using criteria, including document injection, linear search, and index look up. However, other reference set selection criteria are possible.

The number of reference set candidates are analyzed to determine whether there are a sufficient number of candidates (block 95). The number of candidates can be predetermined and selected by a reviewer or machine. If a sufficient number of reference set candidates exist, the reference set candidates form the reference set (block 97). However, if the number of reference set candidates is not sufficient, such as too large, refinement of the candidates is performed to remove one or more reference candidates from the set (block 96). Large reference sets can affect the performance and outcome of document classification. The refinement assists in narrowing the number of reference set candidates to generate a reference set of a particular size. If refinement is to occur, further selection criteria are applied to the reference set candidates. For example, if too many reference set candidates are identified, the candidate set can be narrowed to remove common or closely related documents, while leaving the most important or representative document in the candidate set. The common or closely related documents can be identified as described in commonly-assigned U.S. Pat. No. 6,745,197, entitled "System and Method for Efficiently Processing Messages Stored in Multiple Message Stores," issued on Jun. 1, 2004, and U.S. Pat. No. 6,820,081, entitled "System and Method for Evaluating a Structured Message Store for Message Redundancy," issued on Nov. 16, 2004, the disclosures of which are incorporated by reference. Additionally, the common or closely related documents can be identified based on influential documents, which are described above with reference to FIG. 4, or other measures of document similarity. After the candidate set has been refined, the remaining reference set candidates form the reference set (block 97).

In a further embodiment, features can be used to identify documents for inclusion in the reference set. A collection of documents is obtained and features from the documents are identified. The features are optionally divided into assignments. Seed features are identified and applied to the identified features. The features similar to the seed features are identified as reference set candidate features and the similar features are analyzed to determine whether a sufficient number of reference set candidate features are identified. If not, refinement can occur to increase or decrease the number of reference set candidate features until a sufficient number exists. If so, documents associated with the reference set candidate features are identified and grouped as the reference set.

Figure 7:
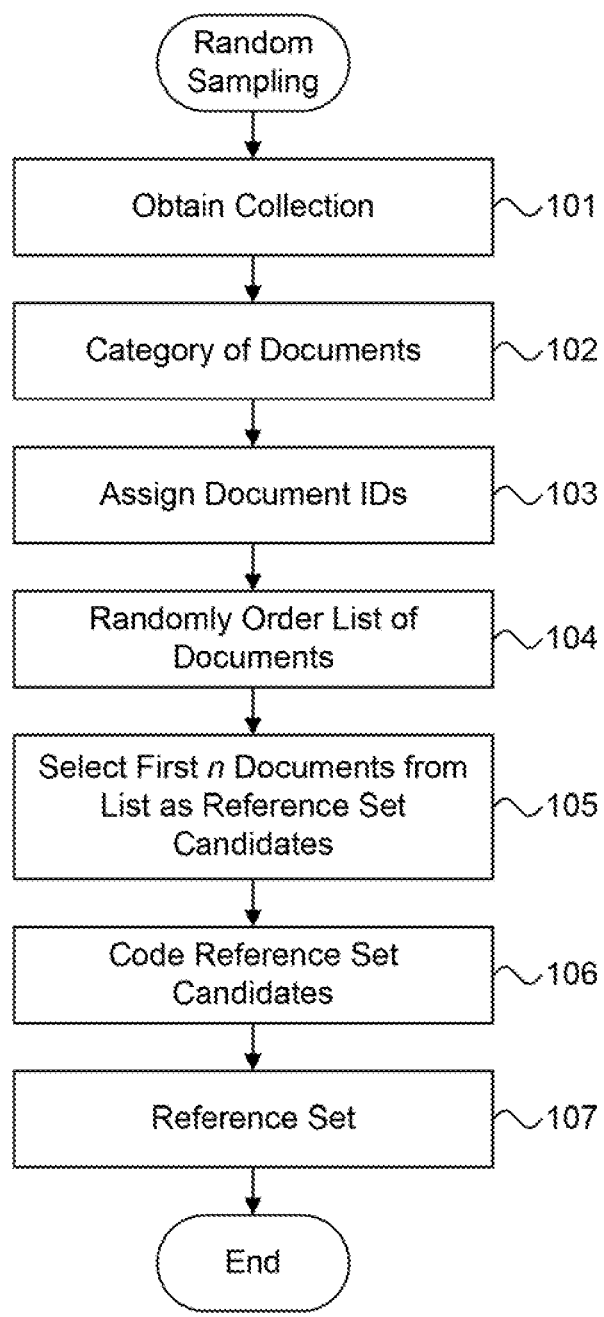
FIG. 7 is a flow diagram showing, by way of example, a method for generating a reference set via random sampling.

Random sampling can also be used as selection criteria to identify reference set candidates. FIG. 7 is a flow diagram showing, by way of example, a method for generating a reference set via random sampling. A collection of documents is obtained (block 101), as described above with reference to FIG. 2. The documents are then grouped into categories (block 102) based on metadata about the documents. The metadata can include date, file, folder, fields, and structure. Other metadata types and groupings are possible. Document identification values are assigned (block 103) to each of the documents in the collection. The identification values can include letters, numbers, symbols or color coding, as well as other values, and can be human readable or machine readable. A random machine generator or a human reviewer can assign the identification values to the documents. Subsequently, the documents are randomly ordered into a list (block 104) and the first n-documents are selected from the list as reference candidates (block 105). In a further embodiment, the document identification values are provided to a random number generator, which randomly selects n document identification values. The documents associated with the selected identification values are then selected as the reference set candidates. The number of n-documents can be determined by a human reviewer, user, or machine. The value of n dictates the size of the reference set. The reference candidates are then coded (block 106) and grouped as the reference set (block 107).

In a further embodiment, features or terms selected from the documents in the collection can be sampled. Features can include metadata about the documents, including nouns, noun phrases, length of document, "To" and "From" fields, date, complexity of sentence structure, and concepts. Other features are possible. Identification values are assigned to the features and a subset of the features or terms are selected, as described supra. Subsequently, the subset of features is randomly ordered into a list and the first n-features are selected as reference candidate features. The documents associated with the selected reference candidate features are then grouped as the reference set. Alternatively, the number of n-features can be randomly selected by a random number generator, which provides n-feature identification values. The features associated with the selected n-feature identification values are selected as reference candidate features.

Figure 8:
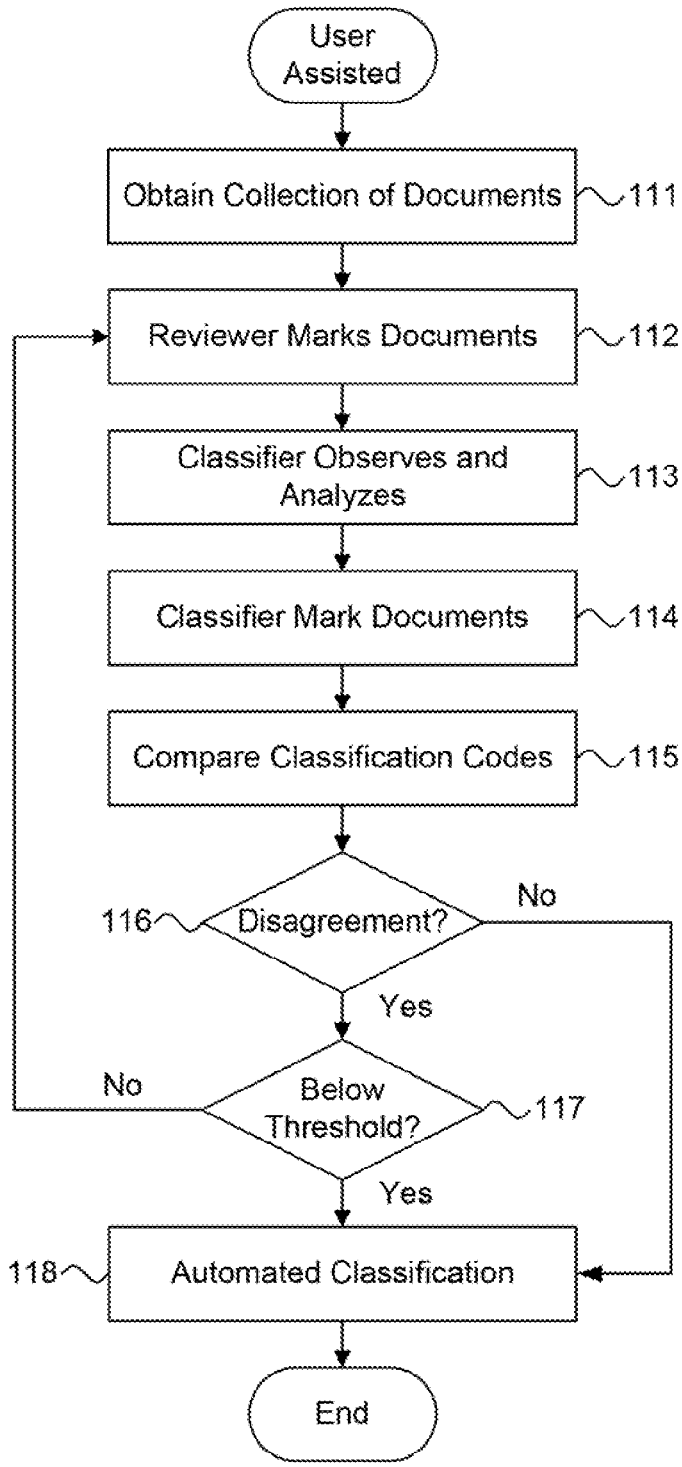
FIG. 8 is a flow diagram showing, by way of example, a method for generating a reference set via user assisted means.

Reference sets for coding documents by a human reviewer or a machine can be the same set or a different set. Reference sets for human reviewers should be cohesive; but need not be representative of a collection of documents since the reviewer is comparing uncoded documents to the reference documents and identifying the similar uncoded documents to assign a classification code. Meanwhile, a reference or "training" set for classifiers should be representative of the collection of documents, so that the classifier can distinguish between documents having different classification codes. FIG. 8 is a flow diagram showing, by way of example, a method 110 for generating a reference set with user assistance. A collection of documents associated with a topic or legal issue is obtained (block 111). A reviewer marks one or more of the documents in the collection by assigning a classification code (block 112). Together, the classified documents can form an initial or candidate reference set, which can be subsequently tested and refined. The reviewer can randomly select the documents, receive review requests for particular documents by a classifier, or receive a predetermined list of documents for marking. In one embodiment, the documents marked by the reviewer can be considered reference documents, which can be used to train a classifier.

While the reviewer is marking the documents, a machine classifier analyzes the coding decisions provided by the reviewer (block 113). The analysis of the coding decisions by the classifier can include one or more steps, which can occur simultaneously or sequentially. In one embodiment, the analysis process is a training or retraining of the classifier. Retraining of the classifier can occur when new information, such as documents or coding decisions are identified. In a further embodiment, multiple classifiers are utilized. Thereafter, the classifier begins classifying documents (block 114) by automatically assigning classification codes to the documents. The classifier can begin classification based on factors, such as a predetermined number of documents for review by the classifier, after a predetermined time period has passed, or after a predetermined number of documents in each classification category is reviewed. For instance, in one embodiment, the classifier can begin classifying documents after analyzing at least two documents coded by the reviewer. As the number of documents analyzed by the classifier prior to classification increases, a confidence level associated with assigned classification codes by the classifier can increase. The classification codes provided by the classifier are compared (block 115) with the classification codes for the same documents provided by the reviewer to determine whether there is a disagreement between the assigned codes (block 116). For example, a disagreement exists when the reviewer assigns a classification code of "privileged" to a document and the classifier assigns the same document a classification code of "responsive."

If a disagreement does not exist (block 116), the classifier begins to automatically classify documents (block 118). However, if a disagreement exists (block 116), a degree of the disagreement is analyzed to determine whether the disagreement falls below a predetermined threshold (block 117). The predetermined threshold can be measured using a percentage, bounded range, or value, as well as other measurements. In one embodiment, the disagreement threshold is set as 99% agreement, or alternatively as 1% disagreement. In a further embodiment, the predetermined threshold is based on a number of agreed upon documents. For example, the threshold can require that the last 100 documents coded by the reviewer and the classifier be in agreement. In yet a further embodiment, zero-defect testing can be used to determine the threshold. A defect can be a disagreement in a coding decision, such as an inconsistency in the classification code assigned. An error rate for classification is determined based on the expected percentages that a particular classification code will be assigned, as well as a confidence level. The error rate can include a percentage, number, or other value. A collection of documents is randomly sampled and marked by the reviewer and classifier. If a value of documents with disagreed upon classification codes exceeds the error rate, further training of the classifier is necessary. However, if the value of documents having a disagreement falls below the error rate, automated classification can begin.

If the disagreement value is below the threshold, the classifier begins to automatically classify documents (block 118). If not, the reviewer continues to mark documents from the collection set (block 112), the classifier analyzes the coding decisions (block 113), the classifier marks documents (block 114), and the classification codes are compared (block 115) until the disagreement of the classification codes assigned by the classifier and the reviewer falls below the predetermined threshold.

In one embodiment, the disagreed upon documents can be selected and grouped as the reference set. Alternatively, all documents marked by the classifier can be included in the reference set, such as the agreed and disagreed upon documents.

In a further embodiment, features can be used to identify documents for inclusion in the reference set. A collection of documents is obtained and features are identified from the collection. A reviewer marks one or more features by assigning classification codes and provides the marked features to a classifier for analysis. After the analysis, the classifier also begins to assign classification codes to the features. The classification codes assigned by the reviewer and the classifier for a common feature are compared to determine whether a disagreement exists. If there is no disagreement, classification of the features becomes automated. However, if there is disagreement, a threshold is applied to determine whether the disagreement falls below threshold. If so, classification of the features becomes automated. However, if not, further marking of the features and analysis occurs.

Figure 9:
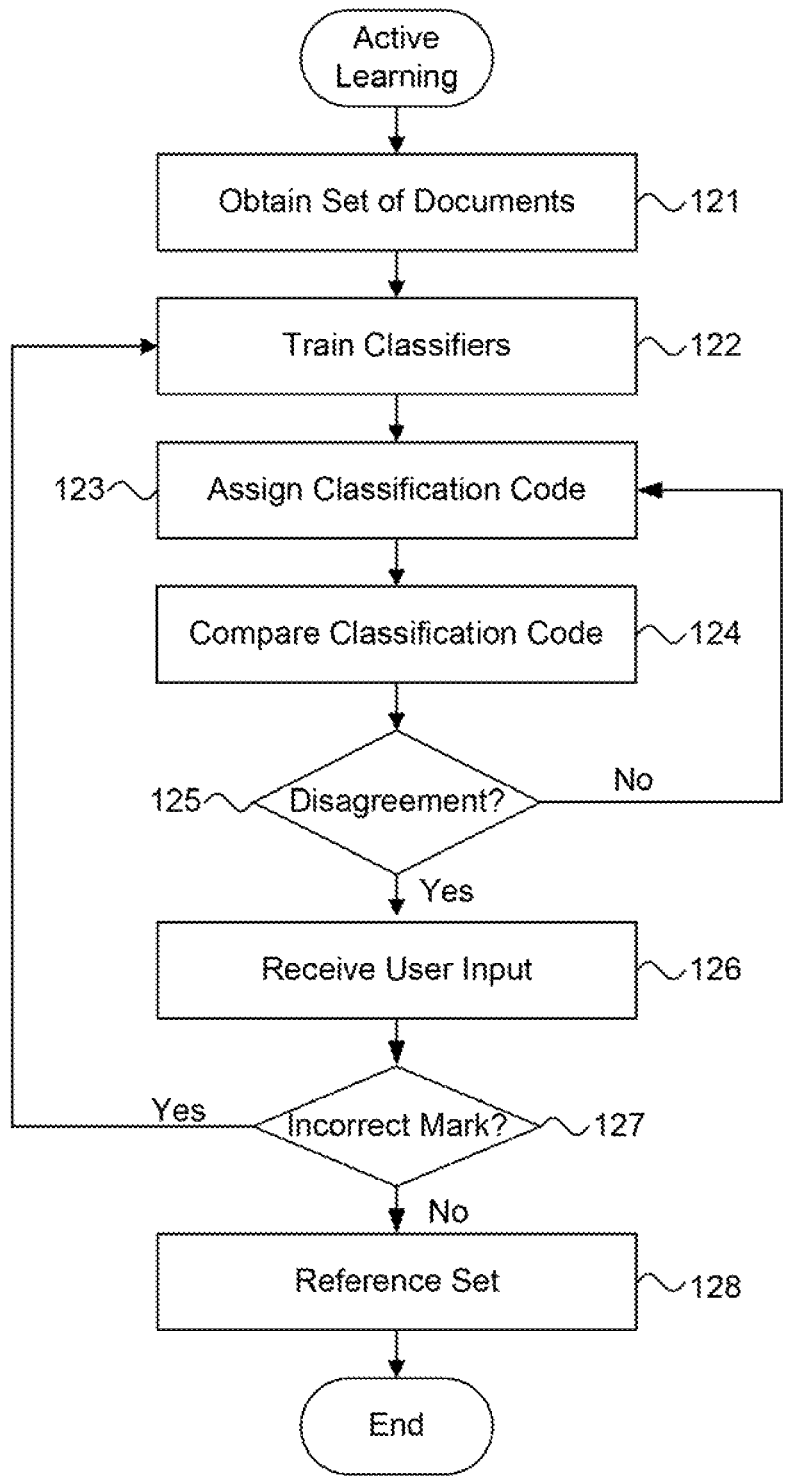
FIG. 9 is a flow diagram showing, by way of example, a method for generating a reference set via active learning.

Reference sets generated using hierarchical clustering, iterative clustering, random sampling, and document seeding rely on the human reviewer for coding of the reference documents. However, a machine, such as a classifier, can also be trained to identify reference sets for use in classifying documents. FIG. 9 is a flow diagram showing, by way of example, a method for generating a reference set via active learning. A set of coded documents is obtained (block 121). The set of documents can include a document seed set or a reference set, as well as other types of document sets. The document set can be obtained from a previous related topic or legal matter, as well as from documents in the current matter. The coding of the document set can be performed by a human reviewer or a machine. The document set can be used to train one or more classifiers (block 122) to identify documents for inclusion in a reference set. The classifiers can be the same or different, including nearest neighbor or Support Vector Machine classifiers, as well as other types of classifiers. The classifiers review and mark a set of uncoded documents for a particular topic, legal matter, theme, or purpose by assigning a classification code (block 123) to each of the uncoded documents. The classification codes assigned by each classifier for the same document are compared (block 124) to determine whether there is a disagreement in classification codes provided by the classifiers (block 125). A disagreement exists when one document is assigned different classification codes. If there is no disagreement, the classifiers continue to review and classify the uncoded documents (block 123) until there are no uncoded documents remaining. Otherwise, if there is a disagreement, the document is provided to a human reviewer for review and marking. The human reviewer provides a new classification code or confirms a classification code assigned by one of the classifiers (block 126). The classifiers that incorrectly marked the document and reviewer assigned classification code (block 127) can be analyzed for further training. For the classifiers that correctly marked the document (block 127), no additional training need occur. The documents receiving inconsistent classification codes by the classifiers form the reference set (block 128). The reference set can then be used to train further classifiers for classifying documents.

In a further embodiment, features can be analyzed to identify reference documents for inclusion in a reference set. A collection of coded documents, such as a seed set or reference set, is obtained. The document set can be obtained from a previous related topic, legal matter, theme or purpose, as well as from documents in the current matter. Features within the document set are identified. The features can include metadata about the documents, including nouns, noun phrases, length of document, to and from fields, date, complexity of sentence structure, and concepts. Other features are possible. The identified features are then classified by a human reviewer and used to train one or more classifiers. Once trained, the classifiers review a further set of uncoded documents, identify features within the further set of uncoded documents, and assign classification codes to the features. The classification codes assigned to a common feature by each classifier are compared to determine whether a discrepancy in the assigned classification code exists. If not, the classifiers continue to review and classify the features of the uncoded documents until no uncoded documents remain. If there is a classification disagreement, the feature is provided to a human reviewer for analysis and coding. The classification code is received from the user and used to retrain the classifiers, which incorrectly coded the feature. Documents associated with the disagreed upon features are identified and grouped to form the reference set.

Feature selection can be used to identify specific areas of two or more documents that are interesting based on the classification disagreement by highlighting or marking the areas of the documents containing the particular disagreed upon features. Documents or sections of documents can be considered interesting based on the classification disagreement because the document data is prompting multiple classifications and should be further reviewed by a human reviewer.

In yet a further embodiment, a combination of the reference documents identified by document and the reference documents identified by features can be combined to create a single reference set of documents.

Figure 10:
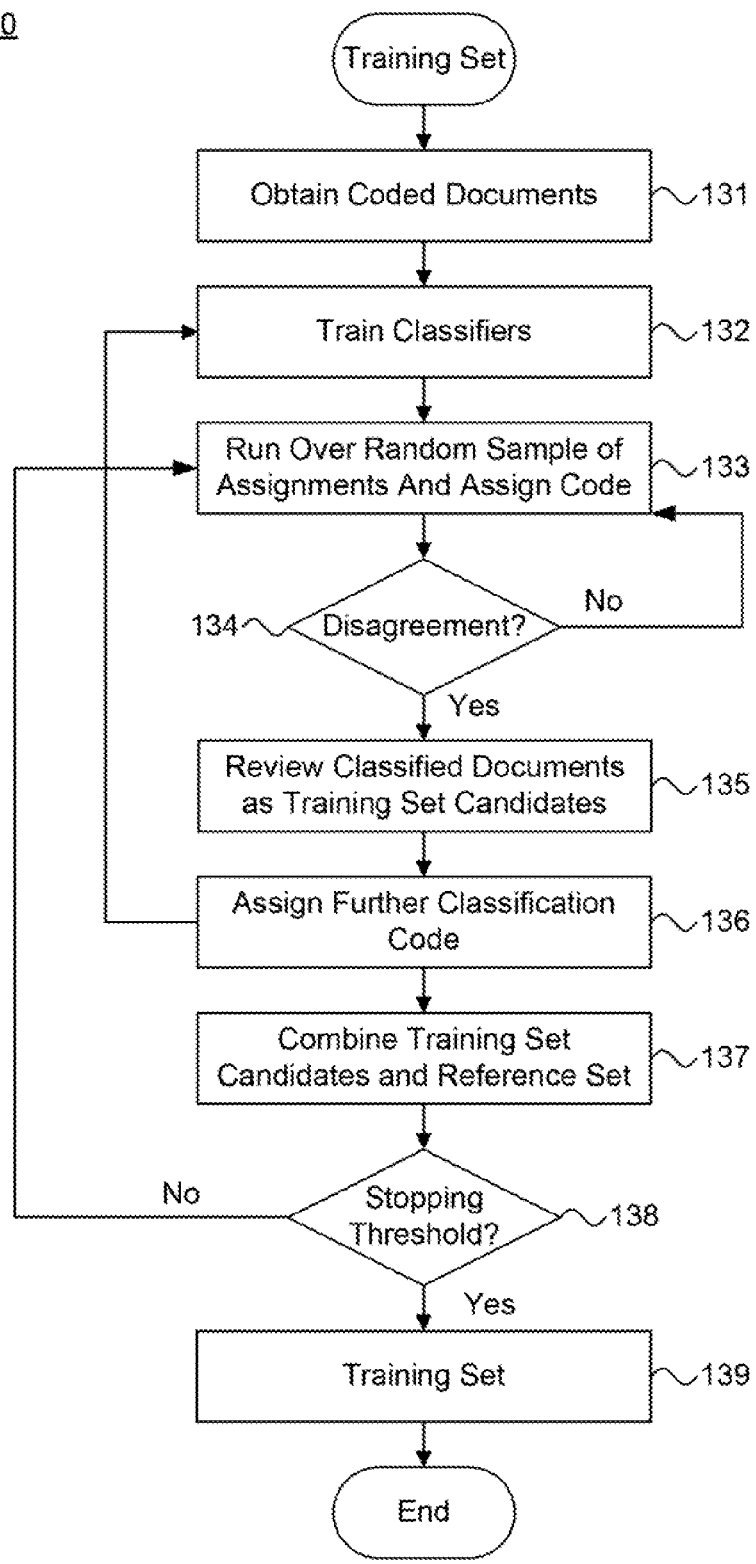
FIG. 10 is a flow diagram showing, by way of example, a method for generating a training set.

The reference set can be provided to a reviewer for use in manually coding documents or can be provided to a classifier for automatically coding the documents. In a further embodiment, different reference sets can be used for providing to a reviewer and a classifier. FIG. 10 is a flow diagram 130 showing, by way of example, a method for generating a training set for a classifier. A set of coded document, such as a reference set, is obtained (block 131). One or more classifiers can be trained (block 132) using the reference set. The classifiers can be the same or different, such as a nearest neighbor classifier or a Support Vector Machine classifier. Other types of classifiers are possible. Once trained, the classifiers are each run over a common sample of assignments to classify documents in that assignment (block 133). The classification codes assigned by each classifier are analyzed for the documents and a determination of whether the classifiers disagree on a particular classification code is made (block 134). If there is no disagreement (block 134), the classifiers are run over further common samples (block 133) of assignments until disagreed upon documents are identified. However, if there is disagreement between the classifiers on a document marking, the classified document in disagreement must then be reviewed (block 135) and identified as training set candidates. A further classification code is assigned to the classified document in disagreement (block 137). The further classification code can be assigned by a human reviewer or a machine, such as one of the classifiers or a different classifier. The classifiers can each be optionally updated (block 132) with the newly assigned code. The review and document coding can occur manually by a reviewer or automatically. The training set candidates are then combined with the reference set (block 137). A stop threshold is applied (block 138) to the combined training set candidates and reference set to determine whether each of the documents is appropriate for inclusion in the training set. The stop threshold can include a predetermined training set size, a breadth of the training set candidates with respect to the feature space of the reference set, or the zero defect test. Other types of tests and processes for determining the stopping threshold are possible. If the threshold is not satisfied, the classifiers are run over further assignments (block 133) for classifying and comparing. Otherwise, if satisfied, the combined training set candidates and reference set form the training set (block 139). Once generated, the training set can be used for automatic classification of documents, such as described above with reference to FIG. 8.

In a further embodiment, features can be used to identify documents for inclusion in the reference set. A set of coded documents is obtained and features are identified from the coded documents. Classifiers are trained using the features and then run over a random sample of features to assign classification codes to the features. The classification codes for a common feature are compared to determine whether a disagreement exists. If not, further features can be classified. However, if so, the disagreed upon features are provided to a reviewer for further analysis. The reviewer can assign further classification codes to the features, which are grouped as training set candidate features. The documents associated with the training set candidate features can be identified as training set candidates and combined with the coded documents. A stop threshold is applied to determine whether each of the documents is appropriate for inclusion in the reference set. If so, the training set candidates and coded documents are identified as the training set. However, if not, further coding of features is performed to identify training set candidates appropriate for inclusion in the reference set.

While the invention has been particularly shown and described as referenced to the embodiments thereof, those skilled in the art will understand that the foregoing and other changes in form and detail may be made therein without departing from the spirit and scope of the invention.

What is claimed is:

1. A computer-implemented method for generating document training sets, comprising:
   providing a set of unclassified documents to each of two or more trained classifiers and receiving a classification code assigned to each unclassified document from each classifier;
   comparing via a server the classification codes assigned to each unclassified document by two or more of the classifiers, wherein the server comprises a central processing unit, memory, an input port to receive the set of unclassified documents, and an output port to provide a training set for a matter;
   determining for at least one of the unclassified documents that a disagreement exists between the classification codes from the two or more classifiers;
   providing via the server for further review the unclassified document with a disagreement in classification codes, wherein results of the further review comprise one of a new classification code and confirmation of one of the assigned classification codes;
   generating the training set for the matter via the server by grouping the unclassified documents for which the disagreement exists; and
   generating a further training set for a same or different matter, comprising:
      training two or more other classifiers by identifying features within one or more coded documents, classifying the features, and utilizing the classified features for training the other classifiers;
      identifying via the other classifiers one or more features within at least one of the unclassified documents;
      assigning by each of the other classifiers, a classification code to each of the identified features;
      comparing the classification codes assigned to each feature;
      determining whether a disagreement exists between the classification codes assigned to at least one of the features via the other classifiers;
      providing the features with a disagreement in classification codes for further review, wherein results of the further review comprise one of a new classification code and confirmation of one of the assigned classification codes; and
      grouping as the further training set the unclassified documents associated with the features for which a disagreement exists.

2. A method according to claim 1, further comprising:
   comparing the classification codes for each of the unclassified documents with the results of the further review;
   identifying those classification codes that differ from the results of the further review; and
   re-training the classifiers that assigned the classification codes that differ from the results.

3. A method according to claim 1, further comprising:
   training the classifiers with coded documents, each coded document assigned with a classification code.

4. A method according to claim 1, wherein the feature classification is performed by an individual.

5. A method according to claim 1, further comprising:
   combining the training set and the further training set as a combined training set.

6. A method according to claim 5, further comprising:
   providing the combined training set to one of an individual for manual classification and to one or more of the other classifiers.

7. A method according to claim 1, further comprising:
   highlighting areas of the unclassified documents that include the features in disagreement; and
   identifying via the highlighted areas, areas of the unclassified documents that are interesting.

8. A method according to claim 1, wherein the further review is performed by an individual.

9. A computer-implemented system for generating document training sets, comprising:
   a set of unclassified documents provided to each of two or more trained classifiers, wherein a classification code assigned to each unclassified document from each classifier; and
   a server comprising a central processing unit, memory, an input port to receive the set of unclassified documents, and an output port to provide a training set for a matter, wherein the central processing unit is configured to:
      compare the classification codes assigned to each unclassified document by two or more of the classifiers;
      determine for at least one of the unclassified documents that a disagreement exists between the classification codes from the two or more classifiers;
      provide for further review the unclassified document with a disagreement in classification codes;
      receiving results of the further review comprising one of a new classification code and confirmation of one of the assigned classification codes;
      generate the training set for the matter by grouping the unclassified documents for which the disagreement exists; and
      generate a further training set for a same or different matter, comprising:
         train two or more other classifiers by identifying features within one or more coded documents, classifying the features, and utilizing the classified features for training the classifiers;
         identify via the other classifiers one or more features within at least one of the unclassified documents;
         assign by each of the other classifiers, a classification code to each of the identified features;

compare the classification codes assigned to each feature;

determine whether a disagreement exists between the classification codes assigned to at least one of the features via the other classifiers;

provide the features with a disagreement in classification codes for further review, wherein results of the further review comprise one of a new classification code and confirmation of one of the assigned classification codes; and group as the further training set the unclassified documents associated with the features for which a disagreement exists.

10. A system according to claim 9, further comprising:
a further comparison module to compare the classification codes for each of the unclassified documents with the results of the further review;
an identification module to identify those classification codes that differ from the results of the further review; and
a re-training module to re-train the classifiers that assigned the classification codes that differ from the results.

11. A system according to claim 9, further comprising:
a training module to train the classifiers with coded documents, each coded document assigned with a classification code.

12. A system according to claim 9, wherein the feature classification is performed by an individual.

13. A system according to claim 9, further comprising:
a combination module to combine the training set and the further training set as a combined training set.

14. A system according to claim 13, further comprising:
a delivery module to provide the combined training set to one of an individual for manual classification and to one or more of the other classifiers.

15. A system according to claim 9, further comprising:
an identification module to highlight areas of the unclassified documents that include the features in disagreement and to identify via the highlighted areas, areas of the unclassified documents that are interesting.

16. A system according to claim 9, wherein the further review is performed by an individual.

* * * * *